(12) United States Patent
Nakamura et al.

(10) Patent No.: US 11,954,335 B2
(45) Date of Patent: Apr. 9, 2024

(54) COMPUTER SYSTEM AND REDUNDANT ELEMENT CONFIGURATION METHOD

(71) Applicant: Hitachi, Ltd., Tokyo (JP)

(72) Inventors: Takaki Nakamura, Tokyo (JP); Hideo Saito, Tokyo (JP); Naruki Kurata, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/950,585

(22) Filed: Sep. 22, 2022

(65) Prior Publication Data

US 2023/0409207 A1 Dec. 21, 2023

(30) Foreign Application Priority Data

Jun. 20, 2022 (JP) ................. 2022-098666

(51) Int. Cl.
*G06F 12/00* (2006.01)
*G06F 3/06* (2006.01)

(52) U.S. Cl.
CPC .......... *G06F 3/0619* (2013.01); *G06F 3/0613* (2013.01); *G06F 3/0659* (2013.01); *G06F 3/067* (2013.01)

(58) Field of Classification Search
CPC ....... G06F 3/0613; G06F 3/0659; G06F 3/067
USPC ...................................................... 711/154
See application file for complete search history.

(56) References Cited

U.S. PATENT DOCUMENTS

| | | | | |
|---|---|---|---|---|
| 9,826,041 | B1* | 11/2017 | Dhoolam | H04L 67/1095 |
| 10,063,427 | B1* | 8/2018 | Brown | H04L 41/22 |
| 10,536,340 | B1* | 1/2020 | Manning | H04L 41/0895 |
| 10,789,267 | B1* | 9/2020 | Dhoolam | G06F 16/27 |
| 11,048,546 | B1* | 6/2021 | Shibayama | G06F 3/0635 |
| 11,394,777 | B2* | 7/2022 | Hall | H04L 12/4641 |
| 11,416,298 | B1* | 8/2022 | Barker, Jr. | G06F 3/0631 |
| 11,461,192 | B1* | 10/2022 | Brahmadesam | G06F 11/2048 |
| 2009/0125680 | A1* | 5/2009 | Ninose | G06F 3/0689 |
| | | | | 711/E12.001 |
| 2010/0042794 | A1* | 2/2010 | Tsai | G06F 11/1461 |
| | | | | 711/170 |
| 2010/0205482 | A1* | 8/2010 | Kaneko | G06F 11/2069 |
| | | | | 714/E11.104 |
| 2012/0023292 | A1* | 1/2012 | Saito | G06F 1/3268 |
| | | | | 711/170 |
| 2012/0185643 | A1* | 7/2012 | DeKoning | G06F 3/0658 |
| | | | | 711/E12.001 |
| 2014/0025886 | A1* | 1/2014 | Tanoue | G06F 11/201 |
| | | | | 711/E12.019 |

(Continued)

FOREIGN PATENT DOCUMENTS

JP 2020-064473 A 4/2020

*Primary Examiner* — Mohamed M Gebril
(74) *Attorney, Agent, or Firm* — MATTINGLY & MALUR, PC

(57) ABSTRACT

Reliability in a storage system can be easily and appropriately improved. In a computer system including a storage system configured to provide a plurality of instances in any one of a plurality of subzones divided by risk boundaries, a processor of the computer system is configured to make a storage controller that controls I/O processing for a volume based on a capacity pool provided by a plurality of storages redundant to the plurality of instances provided in the plurality of subzones.

12 Claims, 24 Drawing Sheets

(56) References Cited

U.S. PATENT DOCUMENTS

| | | | |
|---|---|---|---|
| 2015/0324145 A1* | 11/2015 | Akutsu | G06F 3/0685 |
| | | | 711/114 |
| 2016/0203080 A1* | 7/2016 | Bert | G06F 11/2048 |
| | | | 711/114 |
| 2020/0034206 A1* | 1/2020 | Dimitrov | G06F 9/5077 |
| 2020/0125258 A1 | 4/2020 | Chiba et al. | |
| 2021/0089379 A1* | 3/2021 | Aikawa | G06F 11/1658 |
| 2022/0027051 A1* | 1/2022 | Kant | G06F 3/0605 |
| 2022/0083245 A1* | 3/2022 | Kant | G06F 3/0632 |
| 2022/0129359 A1* | 4/2022 | Toda | G06F 9/45558 |

* cited by examiner

FIG. 17

| REDUNDANT GROUP-SPREAD PLACEMENT GROUP MAPPING TABLE | |
|---|---|
| REDUNDANT GROUP ID (101a) | SPREAD PLACEMENT GROUP ID (101b) |
| 1 | 10 |
| 2 | 22 |
| 2 | 31 |
| 3 | 51 |
| ... | ... |
| ... | ... |

| | | 102 |
|---|---|---|
| SPREAD PLACEMENT GROUP-INSTANCE MAPPING TABLE | | |
| 102a | 102b | 102c |
| SPREAD PLACEMENT GROUP ID | INSTANCE ID | REDUNDANT SDS CLUSTER MANAGEMENT FUNCTION |
| 10 | 10 | PRIMARY MASTER |
| 10 | 21 | SECONDARY MASTER 1 |
| 10 | 33 | SECONDARY MASTER 2 |
| 10 | 45 | - |
| 10 | 46 | - |
| 10 | 50 | - |
| 22 | 9 | - |
| 22 | 11 | - |
| 22 | 15 | - |
| 31 | 20 | - |
| 31 | 25 | - |
| 31 | 27 | - |
| 51 | 22 | - |
| ... | ... | - |
| ... | ... | - |
| ... | ... | - |

SPREAD PLACEMENT GROUP CONFIGURATION TABLE — 103

| OPTION # (103a) | NUMBER OF GROUPS (103b) | NUMBER OF ELEMENTS (103c) |
|---|---|---|
| 1 | 1 | 6 |
| 2 | 2 | 3 |
|  |  |  |

(2)

SPREAD PLACEMENT GROUP CONFIGURATION TABLE — 103

| OPTION # (103a) | NUMBER OF GROUPS (103b) | NUMBER OF ELEMENTS (103c) |
|---|---|---|
| 1 | 1 | 7 |
| 2 | 2 | GROUP 1: 4<br>GROUP 2: 3 |
|  |  |  |

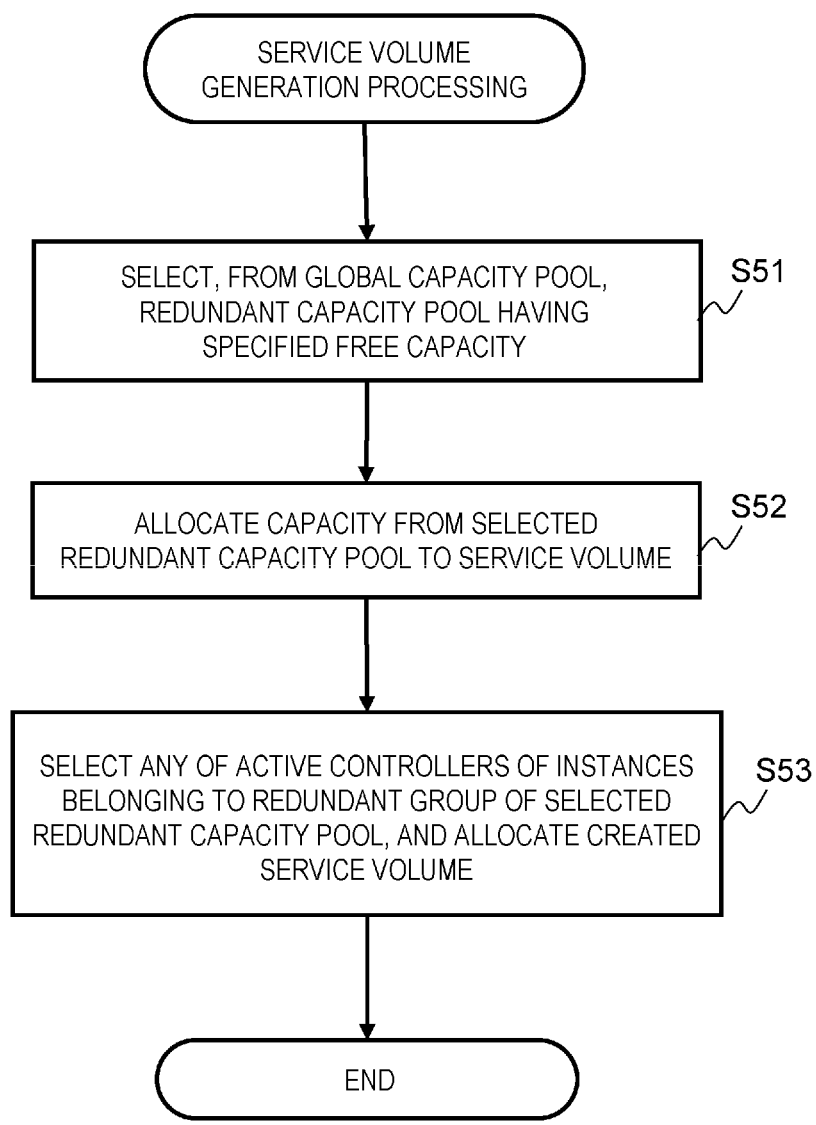

COMPUTER SYSTEM AND REDUNDANT ELEMENT CONFIGURATION METHOD

CROSS-REFERENCE TO RELATED APPLICATION

The present application claims priority from Japanese application JP2022-098666, filed on Jun. 20, 2022, the contents of which is hereby incorporated by reference into this application.

BACKGROUND OF THE INVENTION

1. Field of the Invention

The present invention relates to a configuration technique of a constituent element related to management of data in a computer system including a storage system that is capable of arranging a plurality of instances in a plurality of subzones divided by risk boundaries.

2. Description of the Related Art

For example, a cloud software defined storage (SDS) service is proposed that operates on a public cloud by applying an SDS technique of implementing a storage by operating storage software on a general-purpose server.

In order to implement high availability in the public cloud, for example, a plurality of data centers called availability zones or zones are prepared, and data and services span the plurality of data centers.

In recent years, even in the availability zone, the availability can be improved by utilizing subzones divided by risk boundaries such as power supply boundaries and rack boundaries.

As a related technique, U.S. patent Ser. No. 10/536,340 discloses a technique of a spread placement group (SPG) including a plurality of instances arranged in different subzones. U.S. Pat. No. 9,826,041 discloses a technique in which a replica of a partition of a volume is arranged across a power supply boundary. JP-A-2020-64473 discloses a technique of constructing a storage system having a high degree of freedom while ensuring a certain fault tolerance.

In a storage system, it is required to improve reliability such as high availability of data to be managed.

SUMMARY OF THE INVENTION

The invention is made in view of the above circumstances, and an object thereof is to provide a technique capable of easily and appropriately improving reliability in a storage system.

In order to achieve the above object, a computer system according to one aspect is a computer system including a storage system configured to provide a plurality of instances in any one of a plurality of subzones divided by risk boundaries, in which a processor of the computer system is configured to make a storage controller that controls I/O processing for a volume based on a capacity pool provided by a plurality of storages redundant to the plurality of instances provided in the plurality of subzones.

According to the invention, reliability in a storage system can be easily and appropriately improved.

BRIEF DESCRIPTION OF THE DRAWINGS

FIG. 17 is a configuration diagram of a redundant group-spread placement group mapping table according to the embodiment;

FIG. 18 is a configuration diagram of a spread placement group-instance mapping table according to the embodiment;

FIG. 19 is a configuration diagram illustrating spread placement group configuration tables according to the embodiment;

FIG. 24 is a flowchart of service volume generation processing according to the embodiment.

DESCRIPTION OF THE PREFERRED EMBODIMENTS

Embodiments will be described with reference to drawings. The embodiment described below does not limit the invention according to the claims, and all elements and combinations thereof described in the embodiment are not necessarily essential to the solution of the invention.

In the following description, although information may be described by an expression of "AAA table", the information may be expressed in any data structure. That is, in order to indicate that the information does not depend on the data structure, the "AAA table" may be referred to as "AAA information".

In the following description, processing may be described using a "program" as a subject of an operation, whereas the program may be executed by a processor (for example, a central processing unit (CPU)) to execute predetermined processing while appropriately using a storage unit (for example, a memory) and/or an interface (for example, a port), and thus the subject of the operation of the processing may be the program. The processing described with the program as the subject of the operation may be processing executed by the processor or a computer (for example, a server) including the processor. A hardware circuit that executes a part or all of the processing to be executed by the processor may be provided. Alternatively, the program may be installed from a program source. The program source may be, for example, a program distribution server or a computer-readable (for example, non-transitory) recording medium. In the following description, two or more programs may be implemented as one program, or one program may be implemented as two or more programs.

Figure 1:
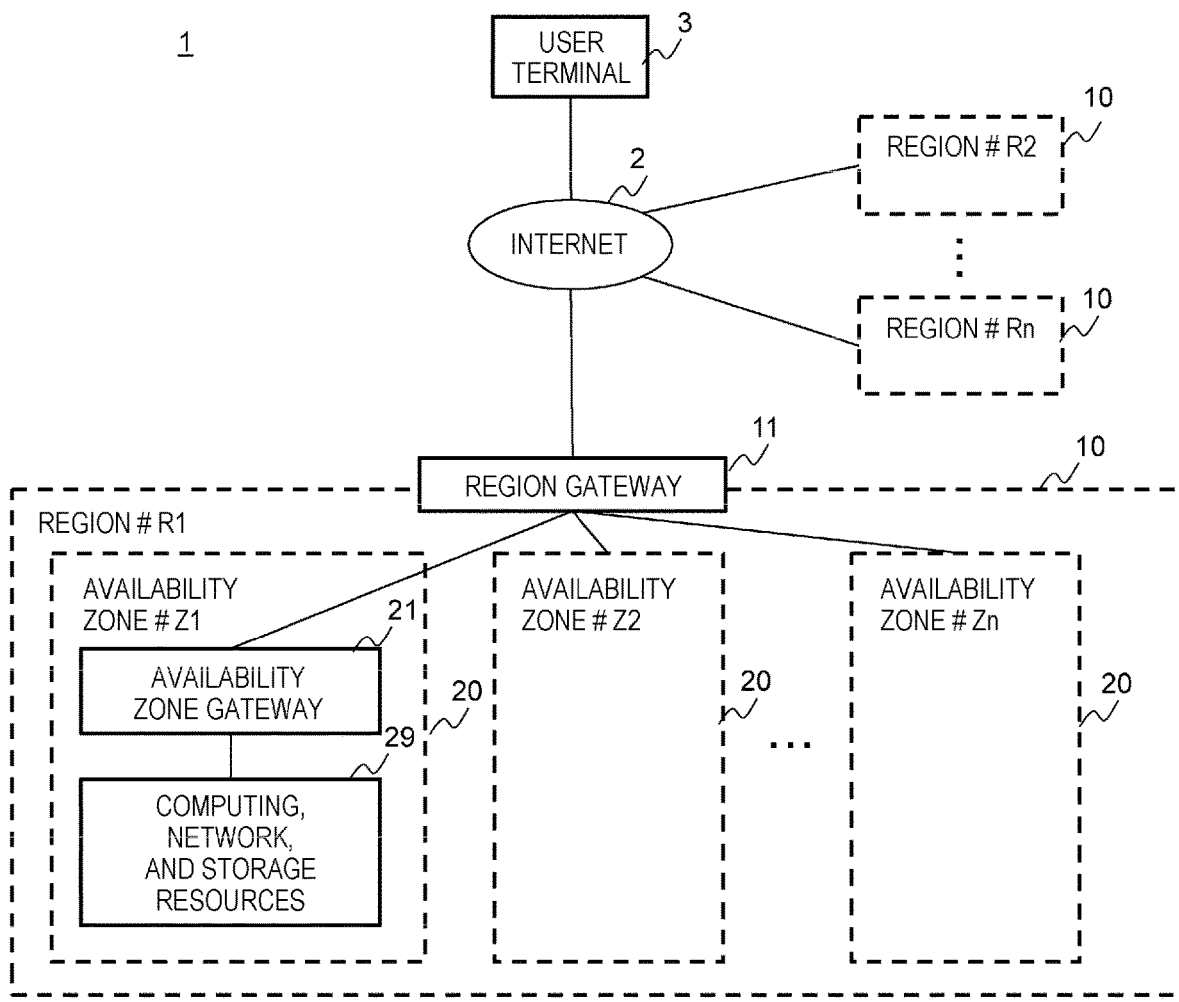
FIG. 1 is an overall configuration diagram of a computer system according to an embodiment.

FIG. 1 is an overall configuration diagram of a computer system according to an embodiment.

A computer system 1 is an example of an environment in which a storage system operates, and includes one or more user terminals 3 and one or more regions 10. The user terminal 3 and the region 10 are connected via an internet 2 which is an example of a network.

The user terminal 3 is a terminal of a user who uses various services provided by the region 10. When there are a plurality of the regions 10, the regions 10 are formed in different countries, for example.

The region 10 includes a region gateway 11 and one or more availability zones 20. The region gateway 11 communicably connects each of the availability zones 20 and the internet 2.

The plurality of availability zones 20 in the region 10 are formed in, for example, different buildings, and power supplies, air-conditioning, and networks are independent so as not to affect the other availability zones 20.

The availability zone 20 includes an availability zone gateway 21 and resources 29 such as computing, a network, and a storage.

Figure 2:
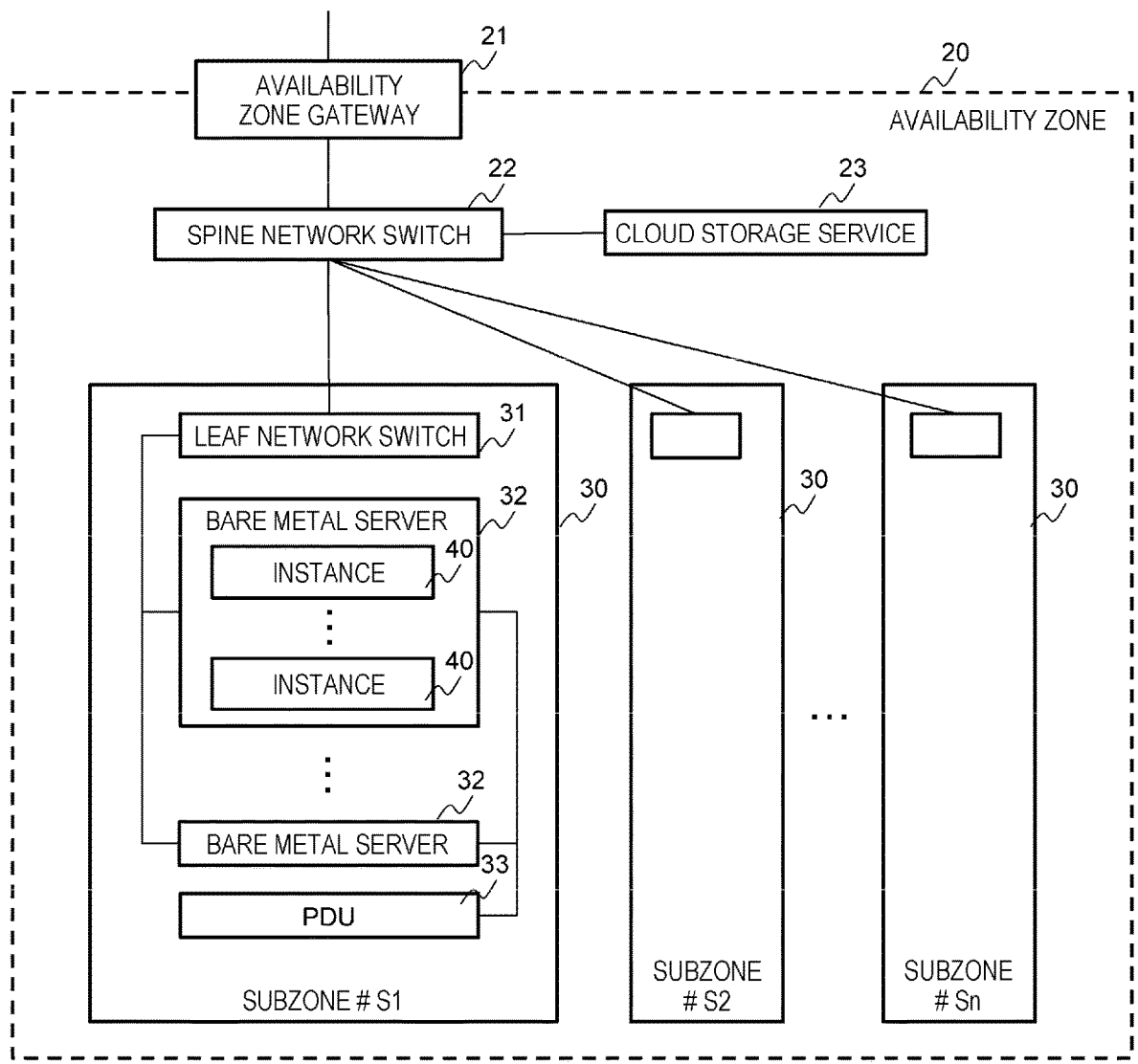
FIG. 2 is a configuration diagram of an availability zone according to the embodiment.

FIG. 2 is a configuration diagram of the availability zone according to the embodiment.

The availability zone 20 includes the availability zone gateway 21, a spine network switch 22, a cloud storage service 23, and a plurality of subzones 30.

The availability zone gateway 21 communicably connects the region gateway 11 and the spine network switch 22.

The cloud storage service 23 includes a plurality of storage devices and the like, and provides a function of storing various types of data to the subzone 30.

The spine network switch 22 mediates communication among the availability zone gateway 21, the cloud storage service 23, and the plurality of subzones 30. The spine network switch 22 and the plurality of subzones 30 are connected in a spine-leaf type.

The subzone 30 includes a leaf network switch 31, one or more bare metal servers 32, and a power distribution unit (PDU) 33. The subzone 30 may be provided with an uninterruptible power supply (UPS). The subzones 30 are divided by a power supply or network risk boundaries. That is, in the subzone 30, the PDU 33 and the leaf network switch 31 are provided independently for each subzone 30 such that the other subzones 30 are not affected by a failure.

The subzone 30 may be implemented as, for example, one server rack, or may be implemented as a plurality of server racks.

The bare metal server 32 includes one or more instances 40. The instance 40 is a functional unit that executes processing, and may be, for example, a virtual machine (VM) activated on the bare metal server 32.

The leaf network switch 31 communicably connects each bare metal server 32 and the spine network switch 22. The PDU 33 is a unit that distributes and supplies electric power from a power supply (for example, a commercial power supply) to each bare metal server 32.

Figure 3:
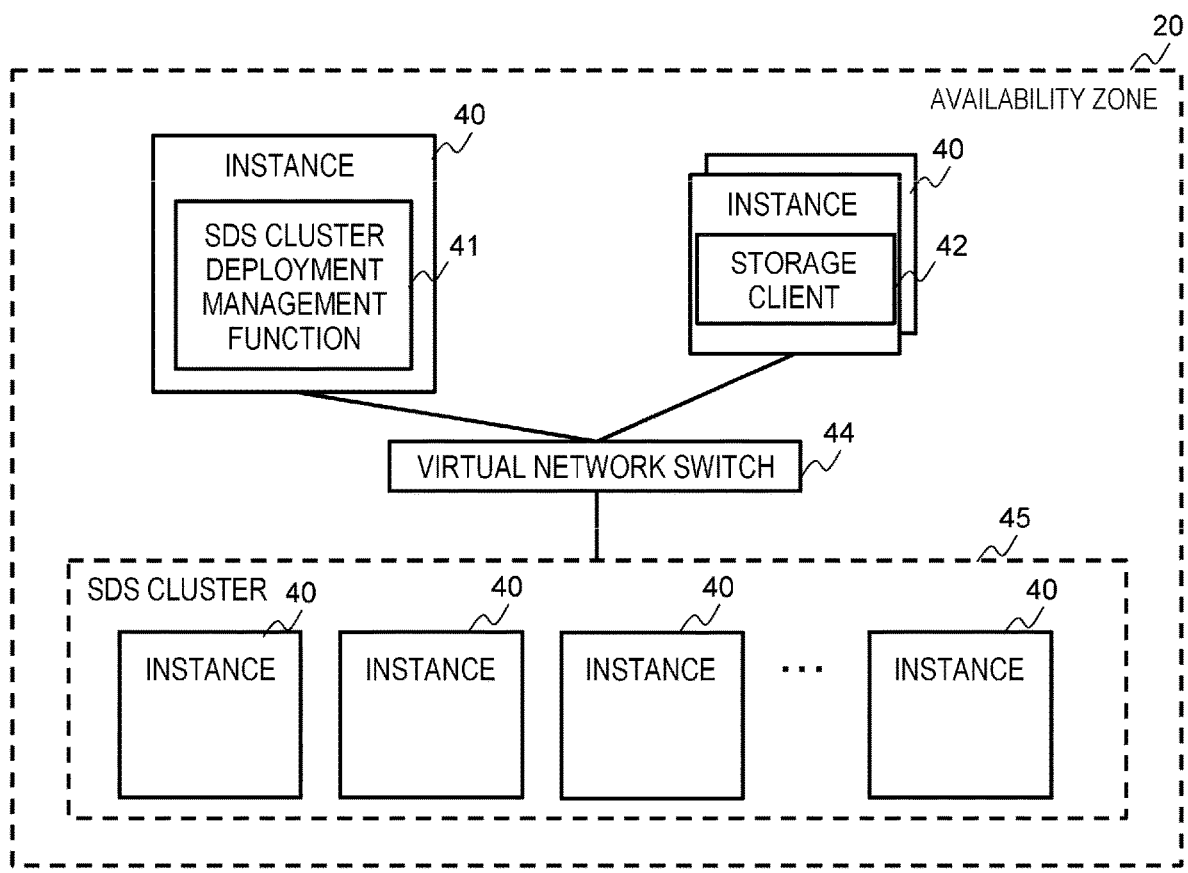
FIG. 3 is a configuration diagram of a storage client and an SDS cluster in the availability zone according to the embodiment.

FIG. 3 is a configuration diagram of a storage client and an SDS cluster in the availability zone according to the embodiment.

The availability zone 20 includes the instance 40 in which a storage client 42 is implemented, the instance 40 in which a software defined storage (SDS) cluster deployment management function 41 is implemented, a plurality of the instances 40 constituting an SDS cluster 45, and a virtual network switch 44 that communicably connects the instances 40.

The storage client 42 executes various types of processing using a storage region provided by the SDS cluster 45. The SDS cluster deployment management function 41 executes processing of managing deployment of the SDS cluster 45.

The SDS cluster 45 includes the plurality of instances 40. The SDS cluster 45 executes various types of processing as a storage system for managing data. In each instance of the SDS cluster 45, a redundant SDS cluster management function 71, a redundant storage controller function 72, a redundant capacity pool function 73, and the like, which will be described later, operate. The data to be managed by the SDS cluster 45 may be stored in a storage device inside the instance 40 or may be stored in a storage device outside the instance 40. The outside storage device is, for example, a volume provided by the cloud storage service 23.

FIG. 3 illustrates an example. In the example, the instance 40 in which the storage client 42 is activated and the instances 40 constituting the SDS cluster 45 are provided in the same availability zone 20. However, the invention is not limited thereto, and the instance 40 in which the storage client 42 is activated and the instances 40 constituting the SDS cluster 45 may be provided in different availability zones 20.

Figure 4:
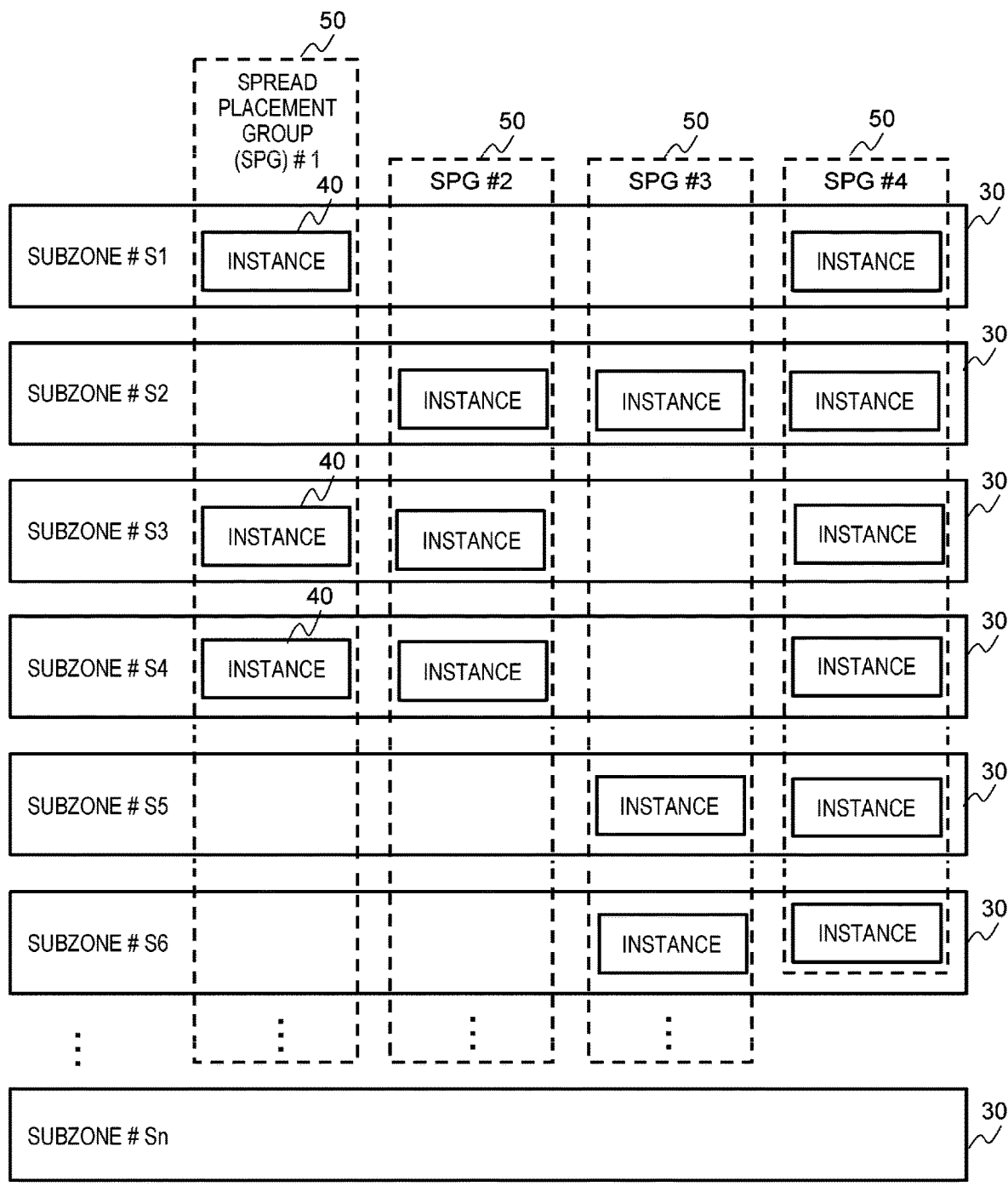
FIG. 4 is a diagram illustrating an arrangement of a spread placement group according to the embodiment.

FIG. 4 is a diagram illustrating an arrangement of a spread placement group according to the embodiment.

Here, a spread placement group (SPG) 50 is a group including a plurality of instances 40 of a plurality of subzones 30 in a manner of one instance 40 for one subzone 30.

In the example illustrated in FIG. 4, the availability zone 20 includes four SPGs 50 including six instances 40. In such a configuration, in each SPG 50, even if a failure in the power supply or the network occurs in any one of the subzones 30, the power supply and the network of the other subzone 30 are not affected, and the instance 40 of the other subzone 30 can continue executing processing.

Next, a hardware configuration of the bare metal server 32 will be described.

Figure 5:
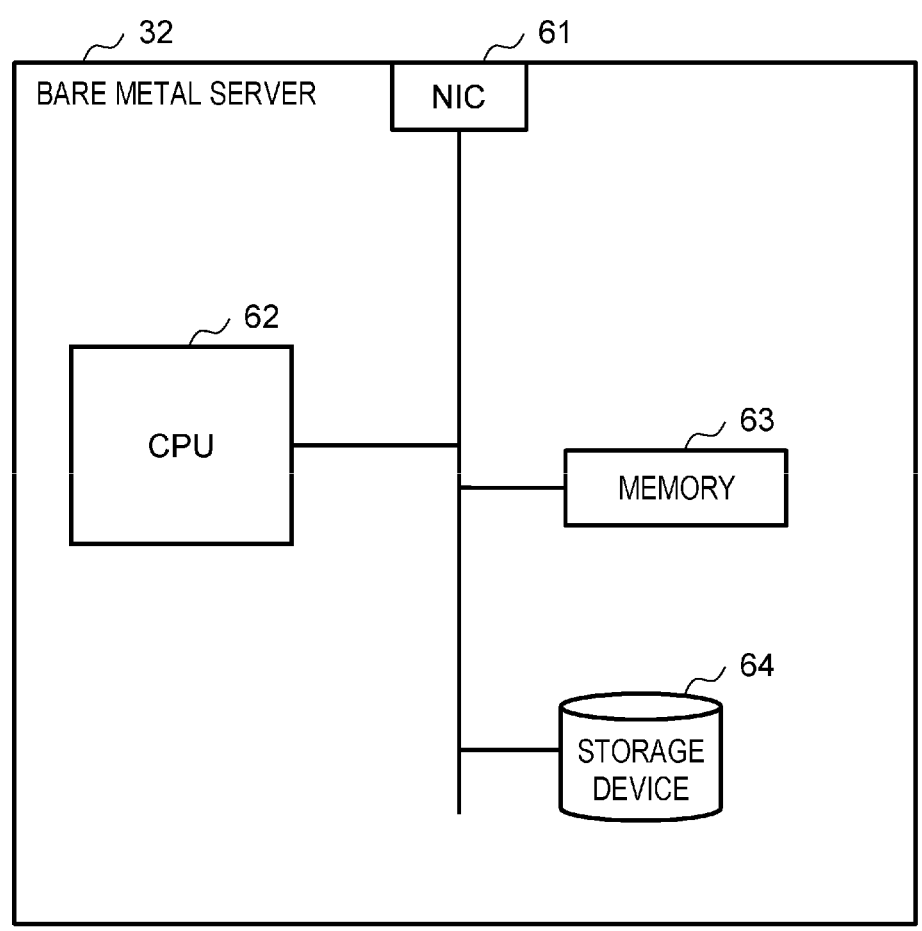
FIG. 5 is a configuration diagram of a bare metal server according to the embodiment.

FIG. 5 is a configuration diagram of the bare metal server according to the embodiment.

The bare metal server 32 includes a network interface card (NIC) 61, a CPU 62 which is an example of the processor, a memory 63, and a storage device 64.

The NIC 61 is an interface such as a wired LAN card or a wireless LAN card.

The CPU 62 executes various types of processing according to programs stored in the memory 63.

The memory 63 is, for example, a random access memory (RAM), and stores the programs executed by the CPU 62 and necessary information.

The storage device 64 may be an NVMe drive, a SAS drive, or a SATA drive. The storage device 64 stores the programs executed by the CPU 62 and data used by the CPU 62. The bare metal server 32 may not include the storage device 64.

Each configuration of the bare metal server 32 is virtually allocated to the instance 40 provided in the bare metal server 32.

Figure 6:
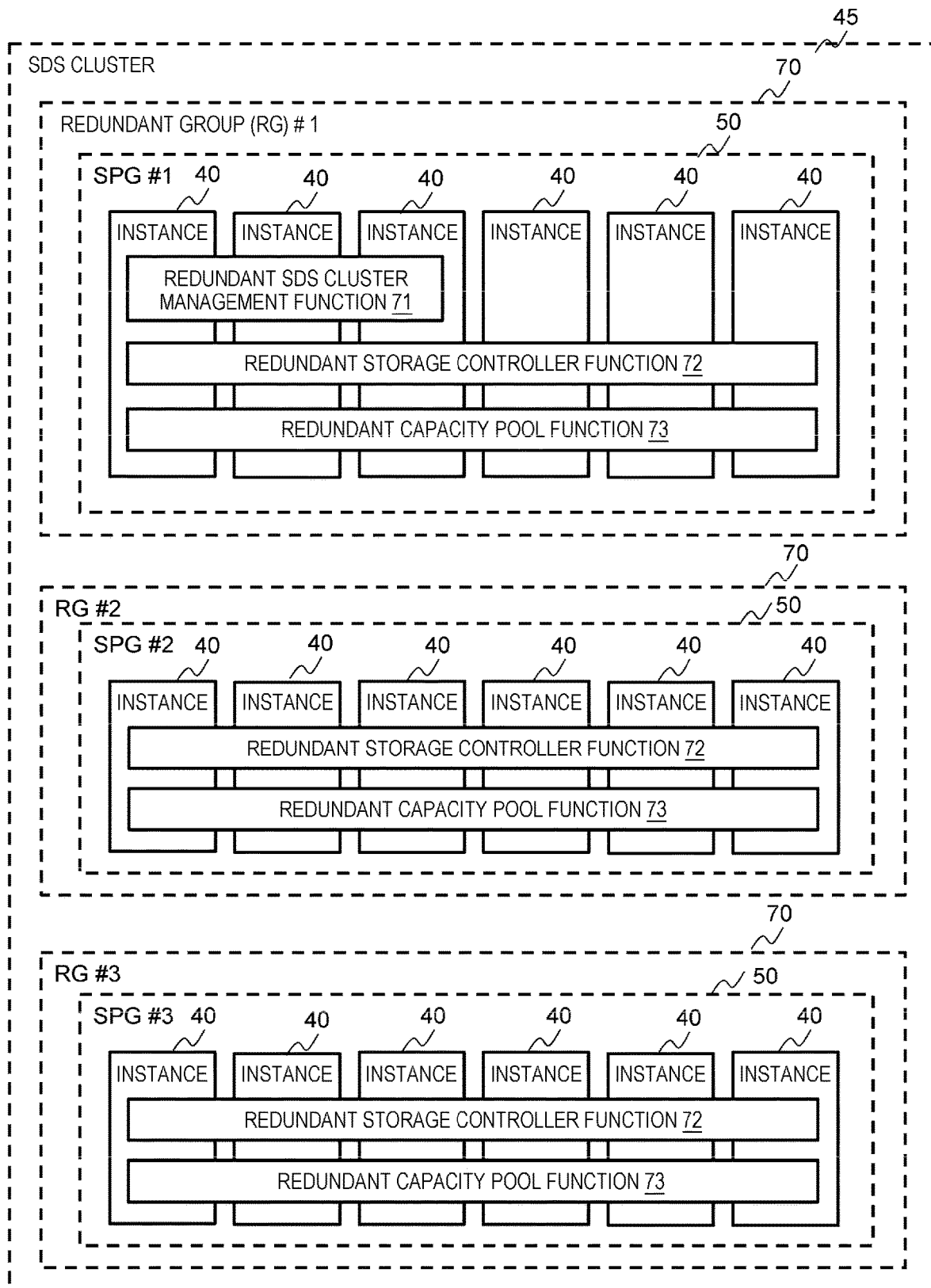
FIG. 6 is a configuration diagram of the SDS cluster according to the embodiment.

FIG. 6 is a configuration diagram of the SDS cluster according to the embodiment.

The SDS cluster 45 includes one or more (three in the example in FIG. 6) redundant groups 70. The redundant group 70 is a group of instances 40 for which redundancy of a capacity pool function, a storage controller function, and an SDS cluster management function is completed.

The redundant group 70 includes one or more (one in FIG. 6) SPGs 50. The SPG 50 includes a plurality of instances 40 (six in the example in FIG. 6).

In one redundant group 70 (an RG #1 in FIG. 6), the redundant SDS cluster management function 71 is implemented.

The redundant SDS cluster management function 71 is a function of making the SDS cluster management function redundant by the plurality of instances 40. In each RG 70, the redundant storage controller function 72 and the redundant capacity pool function 73 are implemented. The redundant storage controller function 72 is a function of making a storage controller redundant by the plurality of instances 40, and the redundant capacity pool function 73 is a function of making a capacity pool redundant.

In the example in FIG. 6, the redundant SDS cluster management function 71, the redundant storage controller function 72, and the redundant capacity pool function 73 are implemented by the instances 40 in the same SPG 50. Even if a failure occurs in the subzone 30 to which any of the instances 40 belongs, the function can be failed over to the instance 40 of the other subzone 30.

Figure 7:
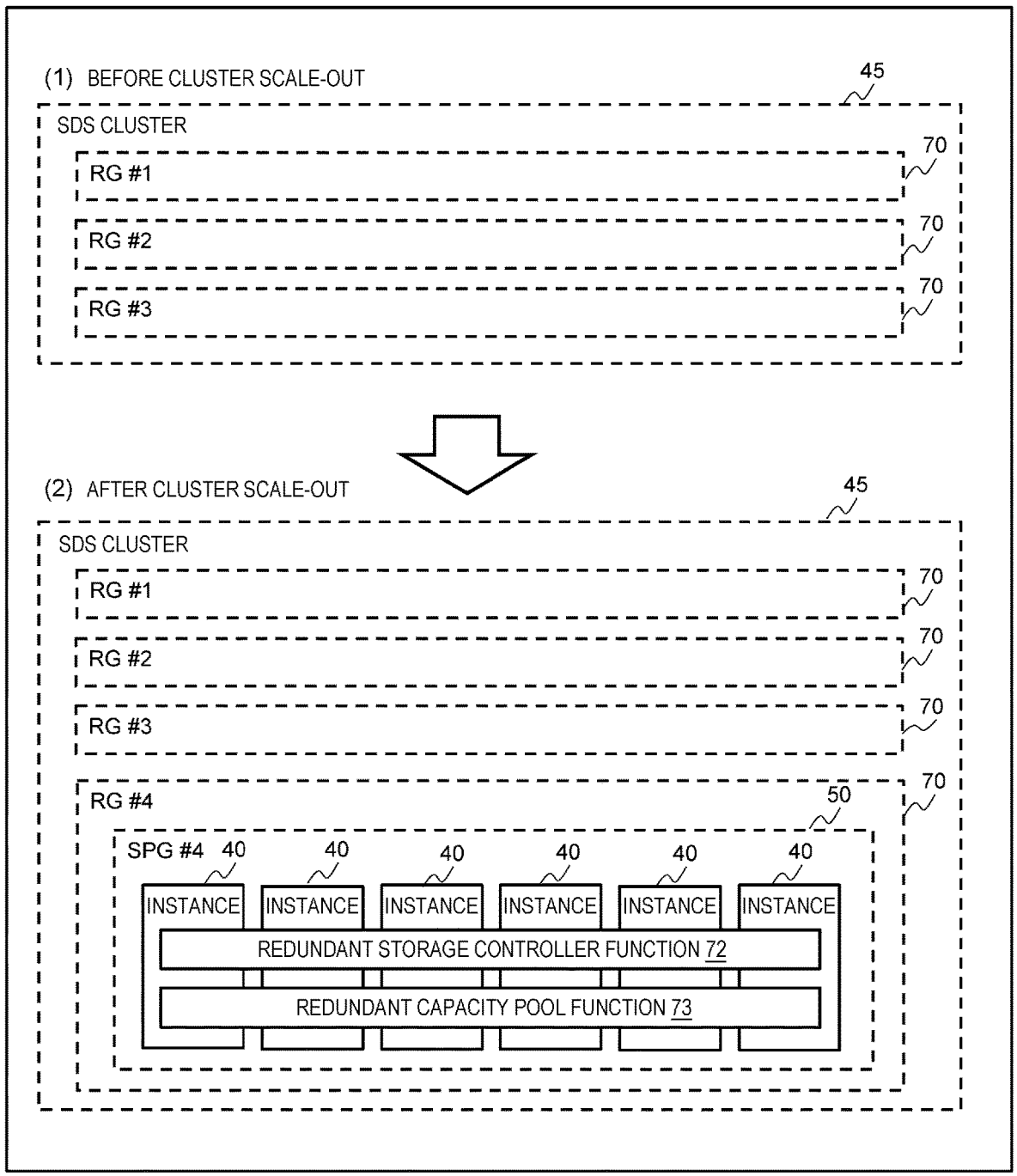
FIG. 7 is a diagram illustrating scale-out of the SDS cluster according to the embodiment.

Next, scale-out of the SDS cluster 45 will be described. FIG. 7 is a diagram illustrating the scale-out of the SDS cluster according to the embodiment. FIG. 7 illustrates an example of scaling out the SDS cluster 45 including three RGs 70 (the RG #1, an RG #2, and an RG #3) illustrated in (1) of FIG. 7.

When scaling out the SDS cluster 45, the redundant SDS cluster management function 71 expands the SDS cluster 45 in units of RG 70 as illustrated in (2) of FIG. 7. Specifically, the redundant SDS cluster management function 71 determines an SPG 50 constituting an RG 70 (an RG #4), and constructs the redundant storage controller function 72 and the redundant capacity pool function 73 by a plurality of instances 40 of the SPG 50.

Next, another configuration example of the redundant group 70 will be described.

Figure 8:
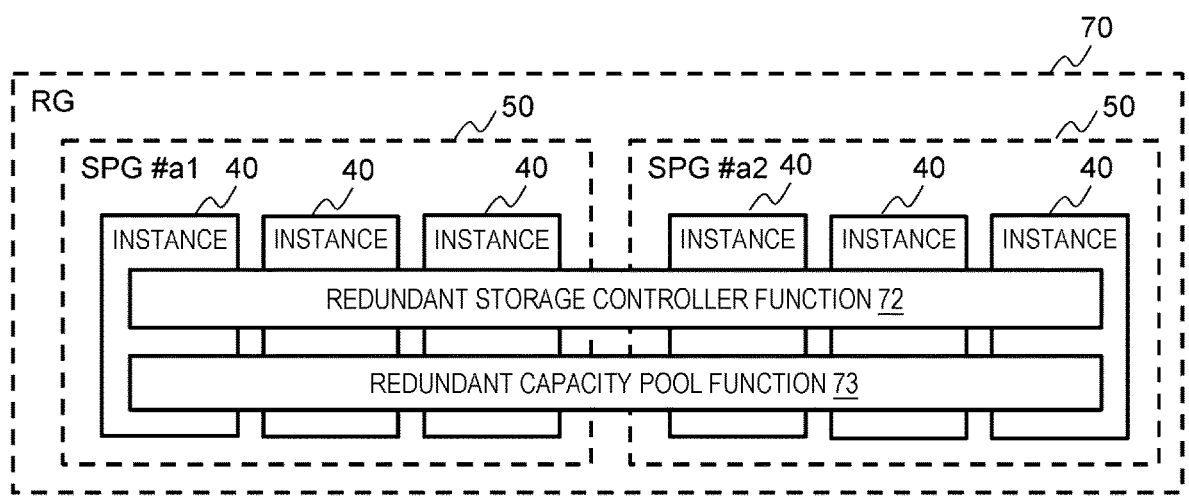
FIG. 8 is a diagram illustrating another configuration example of a redundant group according to the embodiment.

FIG. 8 is a diagram illustrating the other configuration example of the redundant group according to the embodiment.

FIG. 6 illustrates an example in which the RG 70 includes one SPG 50, but for example, when a redundancy degree of the SDS cluster management function, the storage controller, and the capacity pool is 2 or more, a failure that occurs in a part of the RG 70 can be handled even the RG 70 includes a plurality of SPGs 50, and thus the RG 70 may include a plurality of SPGs 50. For example, when the redundancy degree is n, the RG 70 may include n SPGs 50. Here, the redundancy degree refers to the number of SPGs 50 capable of withstanding simultaneous failures.

If the number of instances 40 necessary for the RG 70 is larger than the number of instances capable of being supported in the SPG, or is larger than the number of instances capable of being actually allocated to the SPG, the RG 70 may include a plurality of SPGs 50. In this case, a failure of deploying the SDS cluster and expanding the SDS cluster can be prevented.

In the example in FIG. 8, the RG 70 includes two SPGs 50 (SPG #a1 and SPG #a2). Each SPG 50 includes three instances 40. The number of instances 40 in each SPG 50 is the same but is not limited thereto, and the number of instances 40 may be different.

Next, a configuration example of the redundant capacity pool function will be described.

Figure 9:
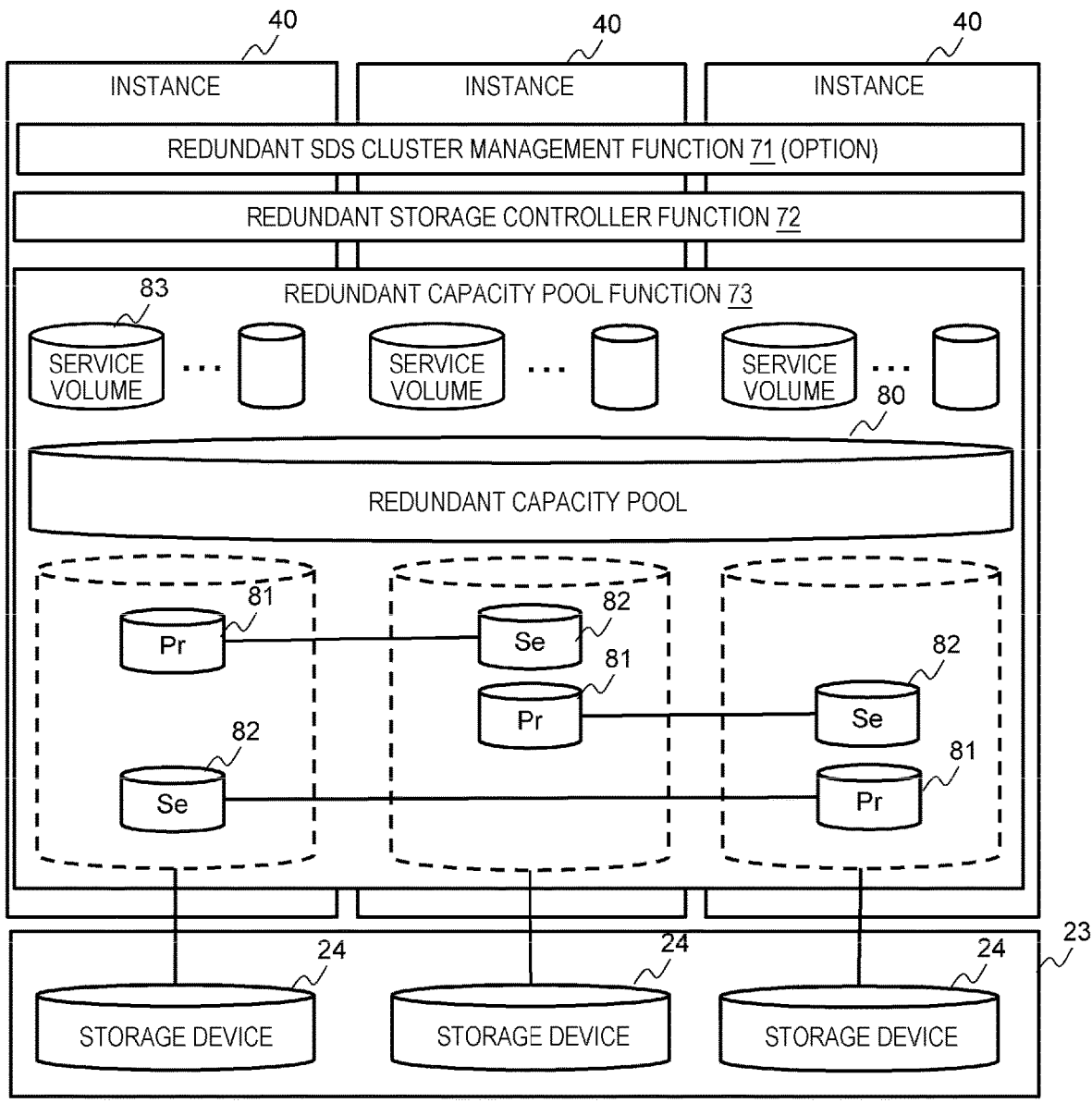
FIG. 9 is a diagram illustrating a configuration example of a redundant capacity pool function according to the embodiment.

FIG. 9 is a diagram illustrating the configuration example of the redundant capacity pool function according to the embodiment. FIG. 9 illustrates an example in which redundancy by mirroring is used in a redundant capacity pool 80.

In the example in FIG. 9, one or more storage devices 24 provided by the cloud storage service 23 are connected to each of the plurality of instances 40 constituting the RG 70. In these instances 40, pairs of a primary chunk 81 and a secondary chunk 82 are implemented by chunks based on storage regions of the storage device 24 connected to another instance 40. The redundant capacity pool 80 is implemented based on a storage region of the primary chunk 81. The redundant capacity pool function 73 provides the redundant storage controller function 72 with a service volume 83, which is a volume to be used by a client, based on a storage region of the redundant capacity pool 80. Instead of the storage device 24, the storage device 64 inside the instance 40 may be used.

Next, another configuration example of the redundant capacity pool function will be described.

Figure 10:
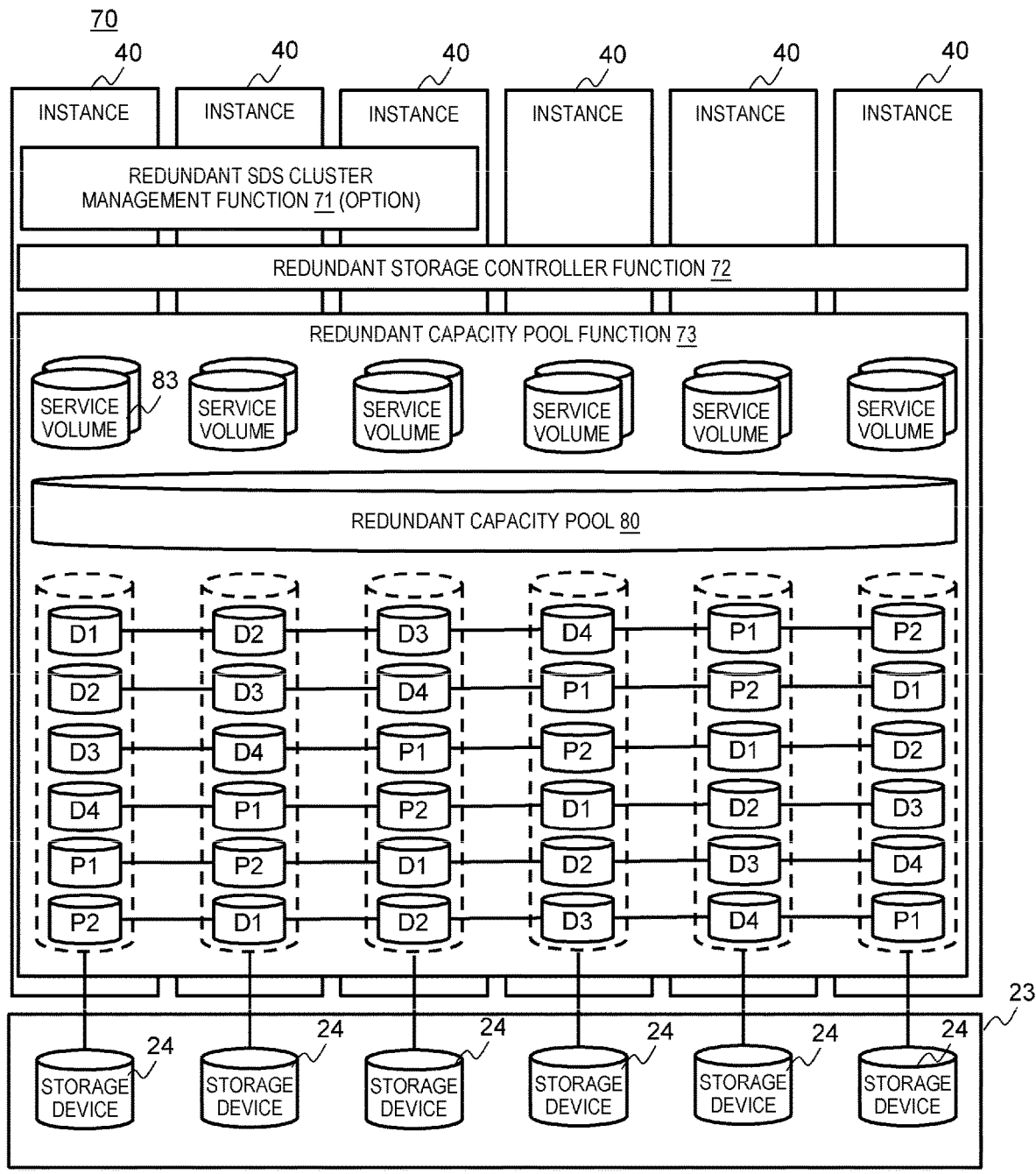
FIG. 10 is a diagram illustrating another configuration example of the redundant capacity pool function according to the embodiment.

FIG. 10 is a diagram illustrating the other configuration example of the redundant capacity pool function according to the embodiment. FIG. 10 illustrates an example in which redundancy attained by erasure cording (4D2P) is used in the redundant capacity pool 80.

In the example in FIG. 10, one or more storage devices 24 provided by the cloud storage service 23 are connected to each of the plurality of instances 40 constituting the RG 70. In these instances 40, a 4D2P configuration is constructed using the storage regions of the storage devices 24 connected to the plurality of (six in the figure) instances 40. The four Ds are data chunks, and the two Ps are parity chunks that store parity data. The redundant capacity pool 80 is implemented based on a data region of the data chunk. The redundant capacity pool function 73 provides the redundant storage controller function 72 with the service volume 83, which is a volume to be used by the client, based on the storage region of the redundant capacity pool 80. Instead of the storage device 24, the storage device 64 inside the instance 40 may be used.

Next, a global capacity pool 84 in a case in which the SDS cluster 45 includes a plurality of RGs 70 will be described.

Figure 11:
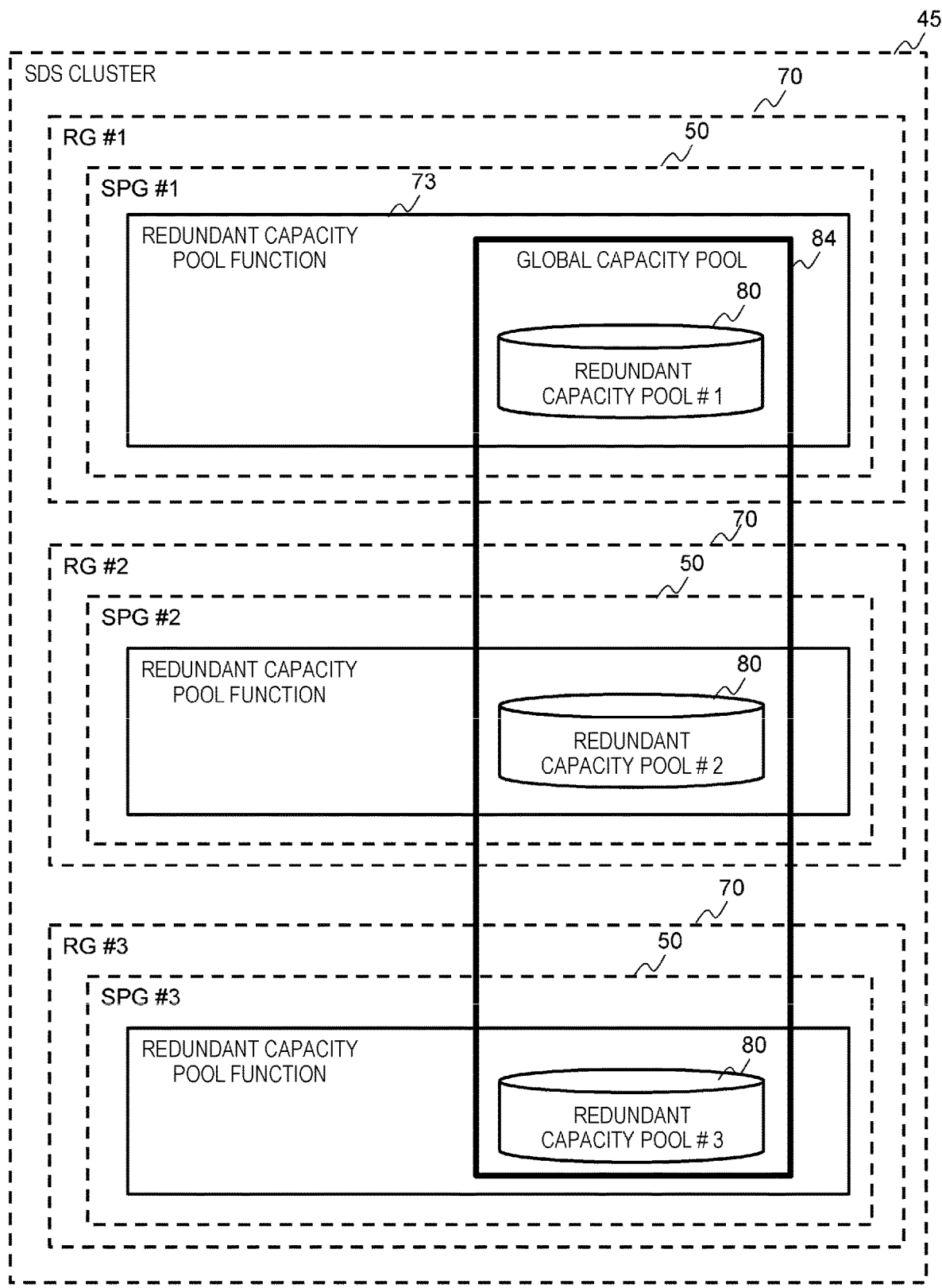
FIG. 11 is a diagram illustrating a configuration of a global capacity pool according to the embodiment.

FIG. 11 is a diagram illustrating a configuration of the global capacity pool according to the embodiment.

Each redundant capacity pool function 73 manages a plurality of redundant capacity pools 80 implemented in the SPGs 50 as one global capacity pool 84 provided by the SDS cluster 45.

Next, the redundant storage controller function 72 will be described.

Figure 12:
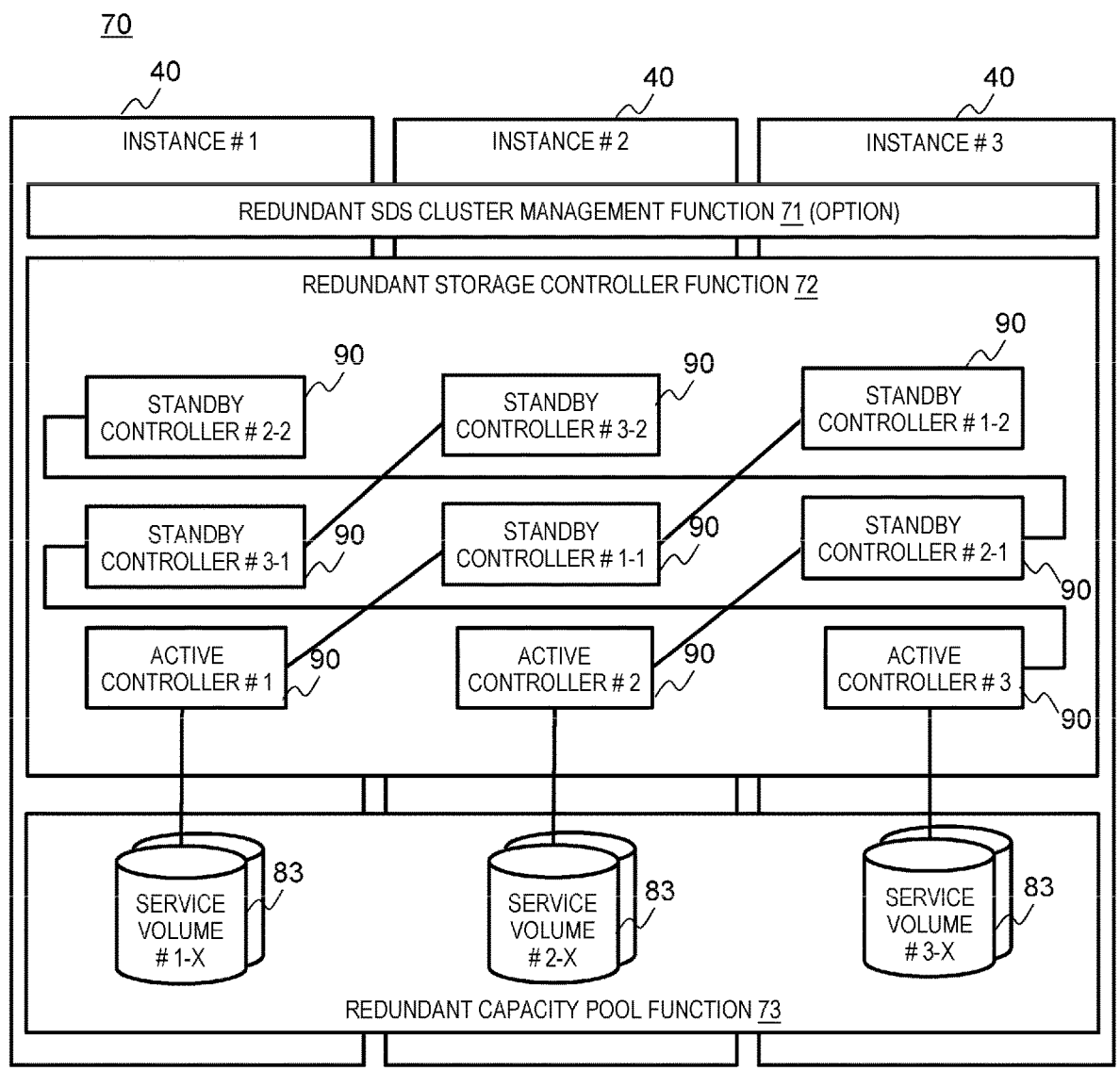
FIG. 12 is a configuration diagram of a redundant storage controller function according to the embodiment.

FIG. 12 is a configuration diagram of the redundant storage controller function according to the embodiment.

In the example in FIG. 12, the redundant storage controller function 72 is implemented by the plurality of instances 40 constituting the RG 70. Regarding the redundant storage controller function 72, an active controller 90 (an example of the storage controller: an active controller) that provides the service volume 83 to the client is provided in each instance 40, and standby controllers 90 (examples of the storage controller: standby controllers) serving as failover destinations of the active controller 90 are provided in the other one or more instances 40 (two in the example in FIG. 12). The controller 90 executes I/O processing and the like for the service volume 83. The active controller and the standby controller synchronize management information of the service volume to be managed (an ID of the active controller, connection information to the service volume, a data layout of the service volume in the redundant capacity pool, and the like).

In the example in FIG. 12, an active controller #1 that manages a service volume #1-*x* is provided in an instance #1, and standby controllers #1-1 and #1-2 corresponding to the active controller #1 are provided in the instances #2 and #3, respectively. An active controller #2 that manages a service volume #2-*x* is provided in the instance #2, and standby controllers #2-1 and #2-2 corresponding to the active controller #2 are provided in the instances #3 and #1, respectively. An active controller #3 that manages a service volume #3-*x* is provided in the instance #3, and standby controllers #3-1 and #3-2 corresponding to the active controller #3 are provided in the instances #1 and #2, respectively.

Next, failover of the redundant storage controller function according to the embodiment will be described.

Figure 13:
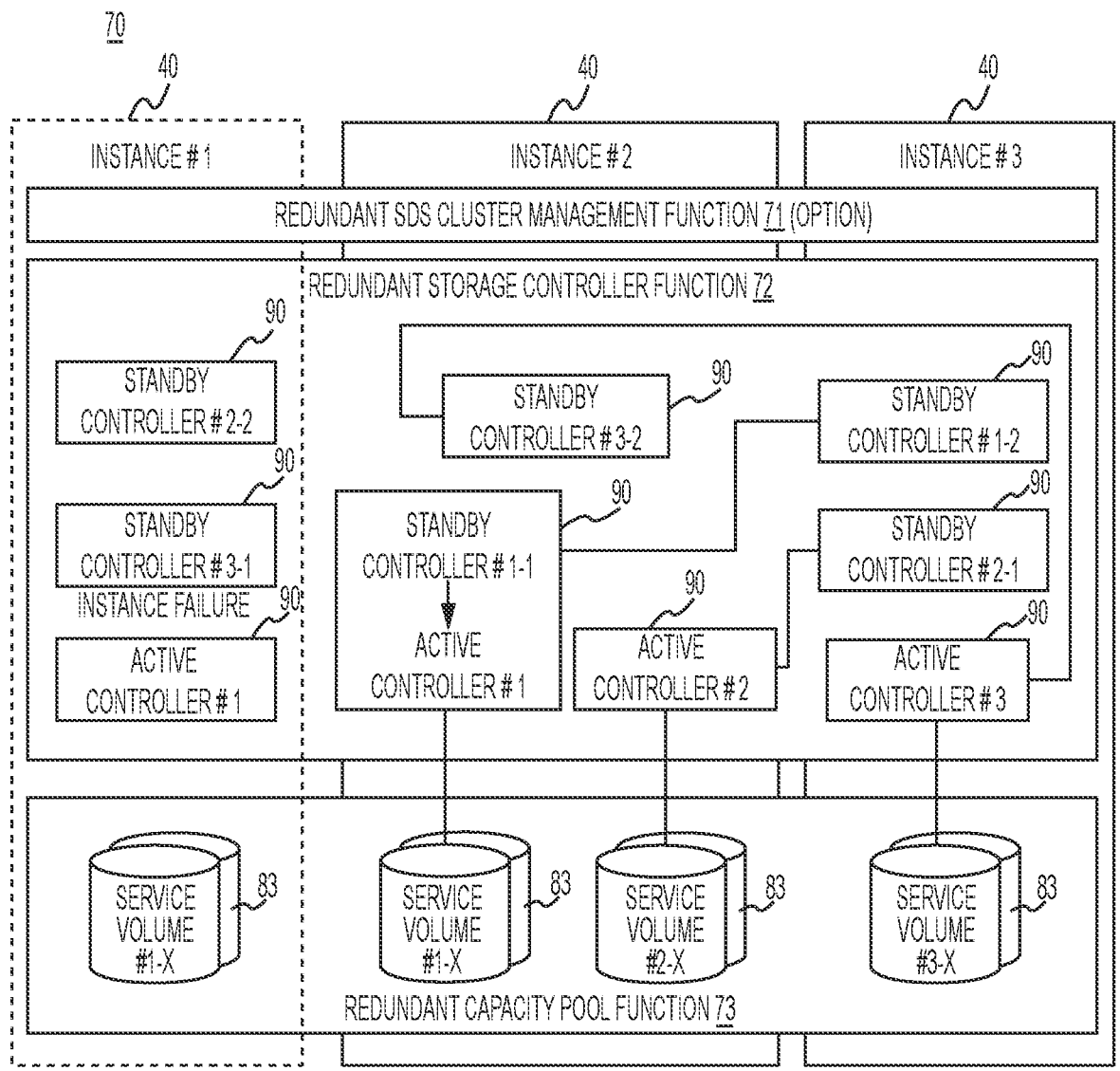
FIG. 13 is a diagram illustrating failover of the redundant storage controller function according to the embodiment.

FIG. 13 is a diagram illustrating the failover of the redundant storage controller function according to the embodiment. FIG. 13 illustrates an example in which an instance failure occurs in the instance #1 illustrated in FIG. 12.

When the instance #1 fails, the standby controller #1-1 of the active controller #1 is promoted to the active controller #1 and operates. Then, the service volume #1-*x* managed by the instance #1 is managed by the active controller #1 of the instance #2.

For switching an access destination to the service volume 83 from the storage client 42 at the time of failover, a mechanism such as asymmetric logical unit access (ALUA), which is a known technique, can be used. Therefore, the storage client 42 issues an 10 request to the service volume #1-*x*, which was issued to the instance #1, to the instance #2 after switching.

Thereafter, when instance #2 further fails, the standby controller #1-2 is promoted to the active controller #1, the standby controller #2-1 is promoted to the active controller #2, and these active controllers of the instance #3 manage the service volumes #1-*x* and #2-*x*.

Next, the redundant SDS cluster management function 71 will be described.

Figure 14:
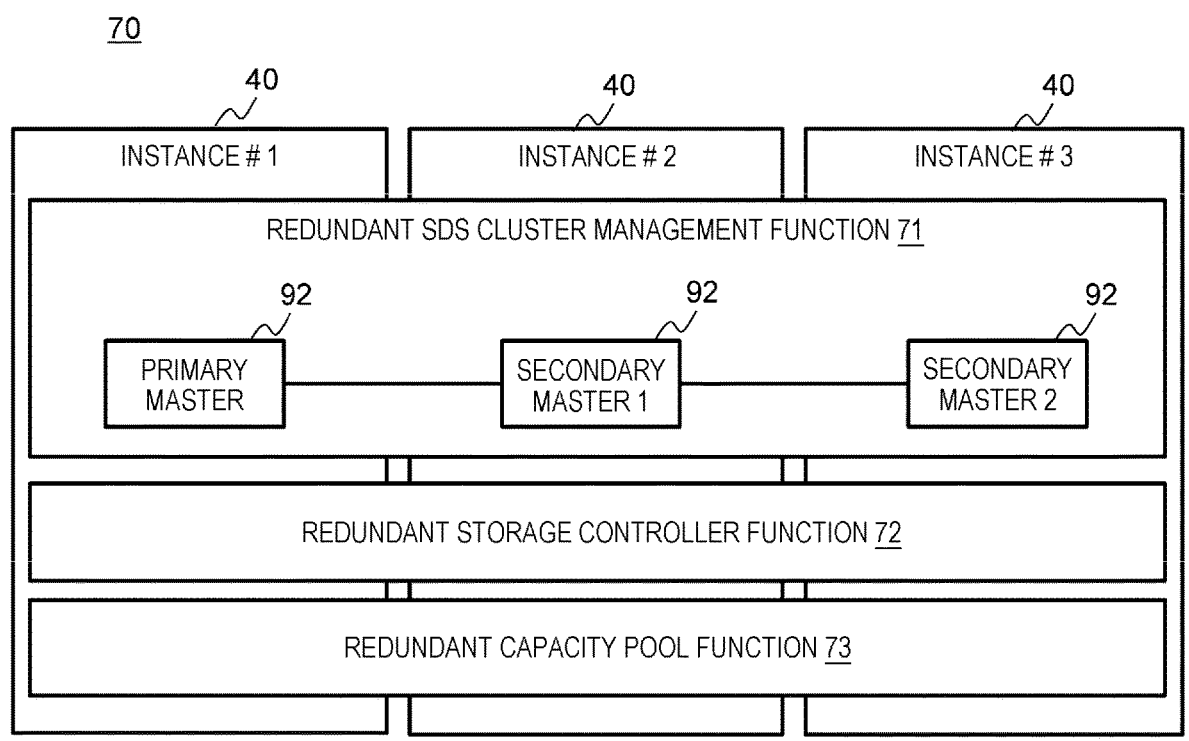
FIG. 14 is a configuration diagram of a redundant SDS cluster management function according to the embodiment.

FIG. 14 is a configuration diagram of the redundant SDS cluster management function according to the embodiment.

In the example in FIG. 14, the redundant SDS cluster management function 71 is implemented by the plurality of instances 40 constituting the RG 70. Regarding the redundant SDS cluster management function 71, an active cluster management unit 92 (a primary master) that manages the SDS cluster is provided in one instance 40, standby cluster management units 92 (a secondary master 1 and a secondary master 2) serving as failover destinations of the active cluster management unit 92 are provided in one or more (two in the example in FIG. 14) other instances 40. The cluster management unit 92 is an example of a storage cluster management unit.

When the instances #1, #2, and #3 are all activated, the cluster management unit 92 (the primary master) of instance #1 manages the cluster. In this case, cluster management information (information on the instances constituting the cluster, service volumes, and the like) is synchronized with the instances #2 and #3.

Here, when the instance #1 is stopped, the cluster management unit 92 (the secondary master 1) of the instance #2 is promoted to the primary master to manage the cluster, and further, when the instance #2 is stopped, the secondary master 2 of the instance #3 is promoted to the primary master to manage the cluster.

Next, a configuration of the memory 63 of the instance 40 will be described in which the SDS cluster deployment management function 41 is implemented.

Figure 15:
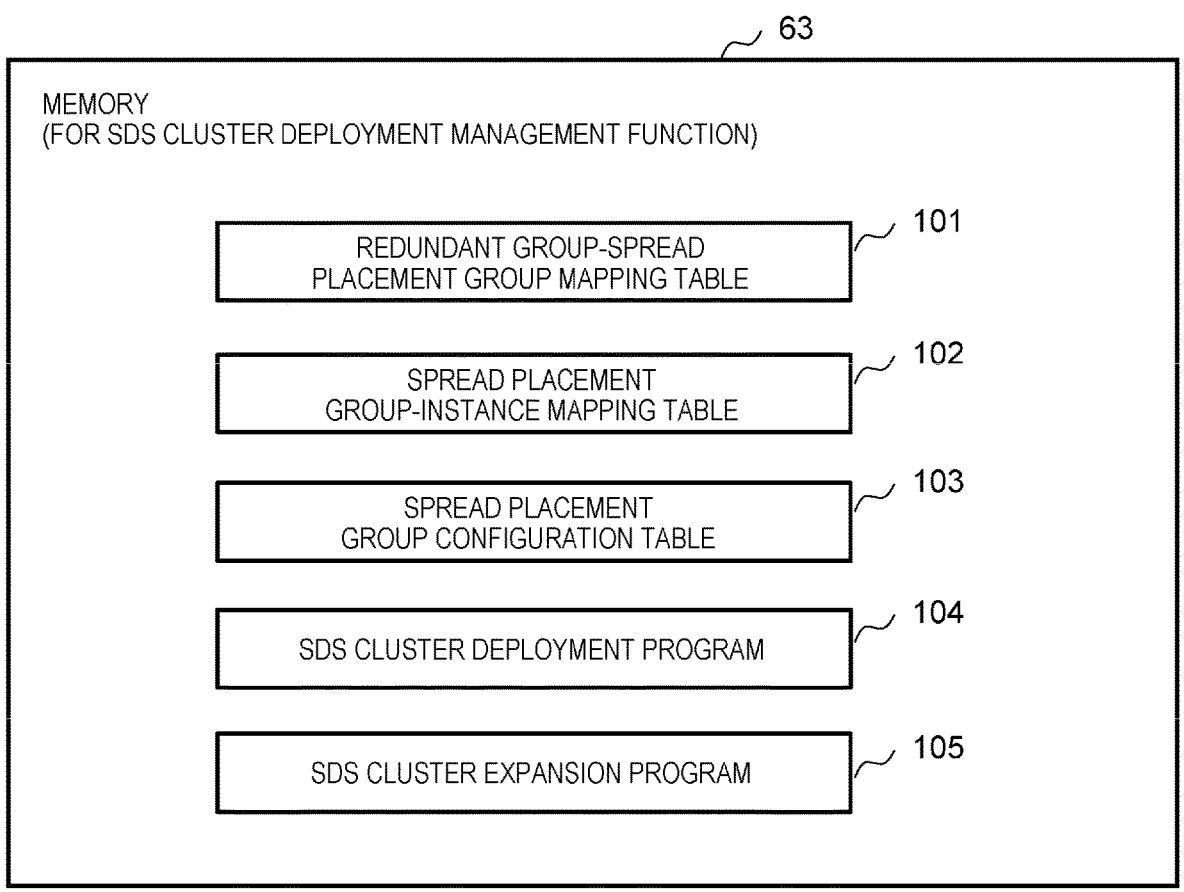
FIG. 15 is a configuration diagram of a memory of an instance in which an SDS cluster deployment management function according to the embodiment is implemented.

FIG. 15 is a configuration diagram of the memory of the instance in which the SDS cluster deployment management function according to the embodiment is implemented.

The memory 63 of the instance 40 in which the SDS cluster deployment management function 41 is implemented stores a redundant group (RG)-spread placement group (SPG) mapping table 101, a spread placement group (SPG)-instance mapping table 102, a spread placement group configuration table 103, an SDS cluster deployment program 104, and an SDS cluster expansion program 105.

The RG-SPG mapping table 101 stores a correspondence between the RG and the SPG included in the RG. The SPG-instance mapping table 102 stores a correspondence between the SPG and the instances constituting the SPG. The SPG configuration table 103 stores information on candidates for the configuration of the SPG. The SDS cluster deployment program 104 is executed by the CPU 62 of the instance 40, thereby executing SDS cluster deployment processing (see FIG. 20) for deploying the SDS cluster. The SDS cluster expansion program 105 is executed by the CPU 62 of the instance 40, thereby executing SDS cluster expansion processing (see FIG. 23) for expanding the SDS cluster 45.

Next, a configuration of the memory 63 of the instance 40 will be described in which the redundant SDS cluster management function 71 is implemented.

Figure 16:
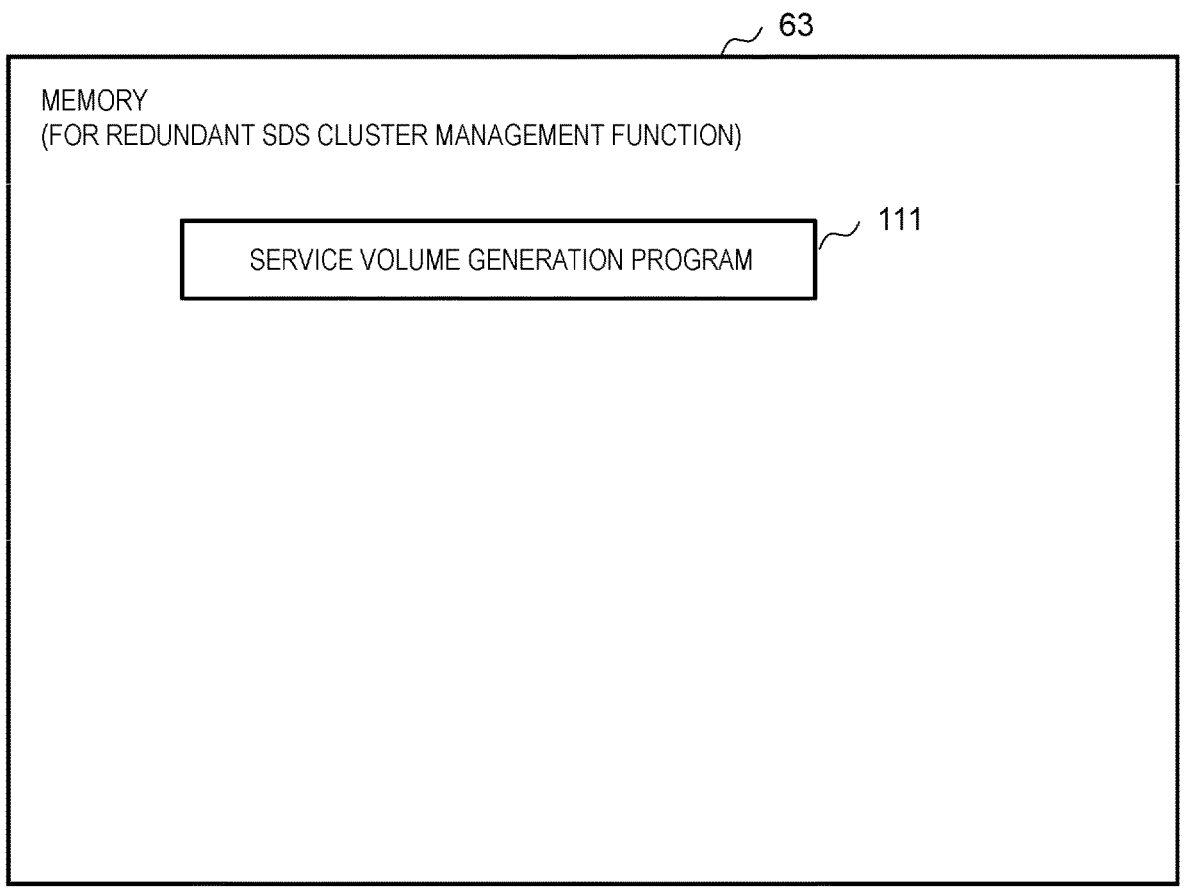
FIG. 16 is a configuration diagram of a memory of an instance in which the redundant SDS cluster management function according to the embodiment is implemented.

FIG. 16 is a configuration diagram of the memory of the instance in which the redundant SDS cluster management function according to the embodiment is implemented.

The memory 63 of the instance 40 in which the redundant SDS cluster management function 71 is implemented stores a service volume generation program 111. The service volume generation program 111 is executed by the CPU 62 of the instance 40, thereby executing service volume generation processing (see FIG. 24) for generating the service volume.

Next, the RG-SPG mapping table 101 will be described.

FIG. 17 is a configuration diagram of the redundant group-spread placement group mapping table according to the embodiment.

Entries of the RG-SPG mapping table 101 include fields of a redundant group ID 101*a* and a spread placement group (SPG) ID 101*b*.

The redundant group ID 101*a* stores an identifier (a redundant group ID: an RG ID) of the redundant group. The SPG ID 101b stores an identifier of the SPG (an SPG ID) included in the redundant group of the same entry.

For example, according to the example of the RG-SPG mapping table 101 in FIG. 17, it can be seen that an RG having an RG ID of 2 includes SPGs having SPG IDs of 22 and 31.

Next, the SPG-instance mapping table 102 will be described.

FIG. 18 is a configuration diagram of the spread placement group-instance mapping table according to the embodiment.

Entries of the SPG-instance mapping table 102 include fields of a spread placement group ID 102a, an instance ID 102b, and a redundant SDS cluster management function 102c.

The spread placement group ID 102a stores the SPG ID. The instance ID 102b stores an ID (an instance ID) of the instance included in the SPG having the SPG ID in the entry. The redundant SDS cluster management function 102c stores a type of the cluster management unit 92 of the redundant SDS cluster management function 71 that is activated in the instance corresponding to the entry. The type includes the primary master that indicates the active cluster management unit and the secondary master (the secondary master 1, the secondary master 2, . . . when there are a plurality of secondary masters) that indicates the standby cluster management unit. Information in the redundant SDS cluster management function 102c may be managed separately from the SPG-instance mapping table 102.

Next, the SPG configuration table 103 will be described.

FIG. 19 is a configuration diagram illustrating the spread placement group configuration tables according to the embodiment. (1) of FIG. 19 illustrates an example in which the number of instances of the RG is divisible by the number of SPGs, and (2) of FIG. 19 illustrates an example in which the number of instances of the RG is not divisible by the number of SPGs.

The SPG configuration table 103 is provided in association with each RG constituting the SDS cluster 45. The SPG configuration table 103 stores entries for each option of the SPG configuration in the RG. Entries of the SPG configuration table 103 include an option #103a, the number of groups 103b, and the number of elements 103c.

The option #103a stores an option number corresponding to the entry. The number of groups 103b stores the number of SPGs in a configuration of the option corresponding to the entry. The number of elements 103c stores the number of elements (constituent elements, which are instances in this example) included in the SPG of the option corresponding to the entry.

Here, as illustrated in (1) of FIG. 19, if the number of instances (6) in the RG of the option is divisible by the number of SPGs (2), one number of elements is stored in the number of elements 103c, as illustrated in a second entry. As illustrated in (2) of FIG. 19, if the number of instances (7) in the RG of the option is not divisible by the number of SPGs (2), the numbers of elements for a plurality of groups are stored in the number of elements 103c, as illustrated in the second entry.

Next, the SDS cluster deployment processing will be described. The SDS cluster deployment processing is executed when, for example, the SDS cluster deployment program 104 receives an instruction to deploy the SDS cluster from the user terminal 3.

Figure 20:
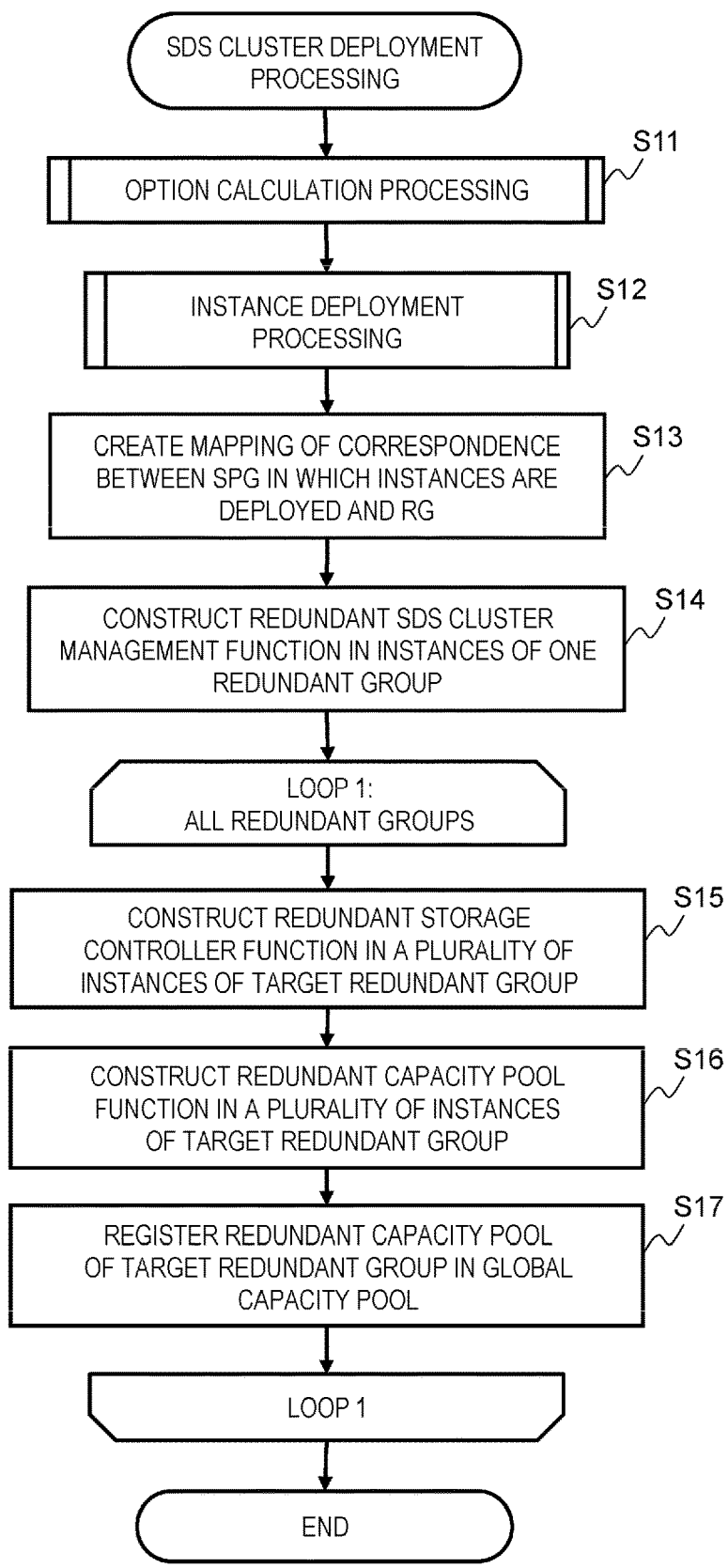
FIG. 20 is a flowchart of SDS cluster deployment processing according to the embodiment.

FIG. 20 is a flowchart of the SDS cluster deployment processing according to the embodiment.

The SDS cluster deployment program 104 (strictly speaking, the CPU 62 that executes the SDS cluster deployment program 104) executes option calculation processing (see FIG. 21) of calculating an option of the number of groups of the SPG and the number of elements (instances) in the SPG (S11).

Next, the SDS cluster deployment program 104 executes instance deployment processing (see FIG. 22) of deploying instances using the SPG (S12).

Next, the SDS cluster deployment program 104 creates a mapping (the RG-SPG mapping table 101) of the correspondence between the SPG in which the instances are deployed and the RG including the SPG (S13).

Next, the SDS cluster deployment program 104 constructs the redundant SDS cluster management function 71 in a plurality of instances 40 of any one of the redundant groups (S14). Here, the SDS cluster management unit of the redundant SDS cluster management function 71 may not be constructed in all the instances 40 of the redundant group, and may be constructed in, for example, necessary redundancy degree+1 instances 40.

Next, the SDS cluster deployment program 104 executes processing (S15 to S17) of a loop 1 for each redundant group. Here, a redundant group to be processed in the loop 1 is referred to as a target redundant group.

In the processing of the loop 1, the SDS cluster deployment program 104 constructs the redundant storage controller function 72 in a plurality of instances 40 of the target redundant group (S15). Next, the SDS cluster deployment program 104 constructs the redundant capacity pool function 73 in a plurality of instances 40 of the target redundant group (S16). Next, the SDS cluster deployment program 104 registers the redundant capacity pool 80 of the target redundant group in the global capacity pool 84 (S17).

The SDS cluster deployment program 104 executes the processing of the loop 1 for each redundant group, and ends the SDS cluster deployment processing when the processing is completed for all redundant groups.

According to the SDS cluster deployment processing, a redundant SDS cluster capable of withstanding failures can be created.

Next, the option calculation processing (S11) will be described.

Figure 21:
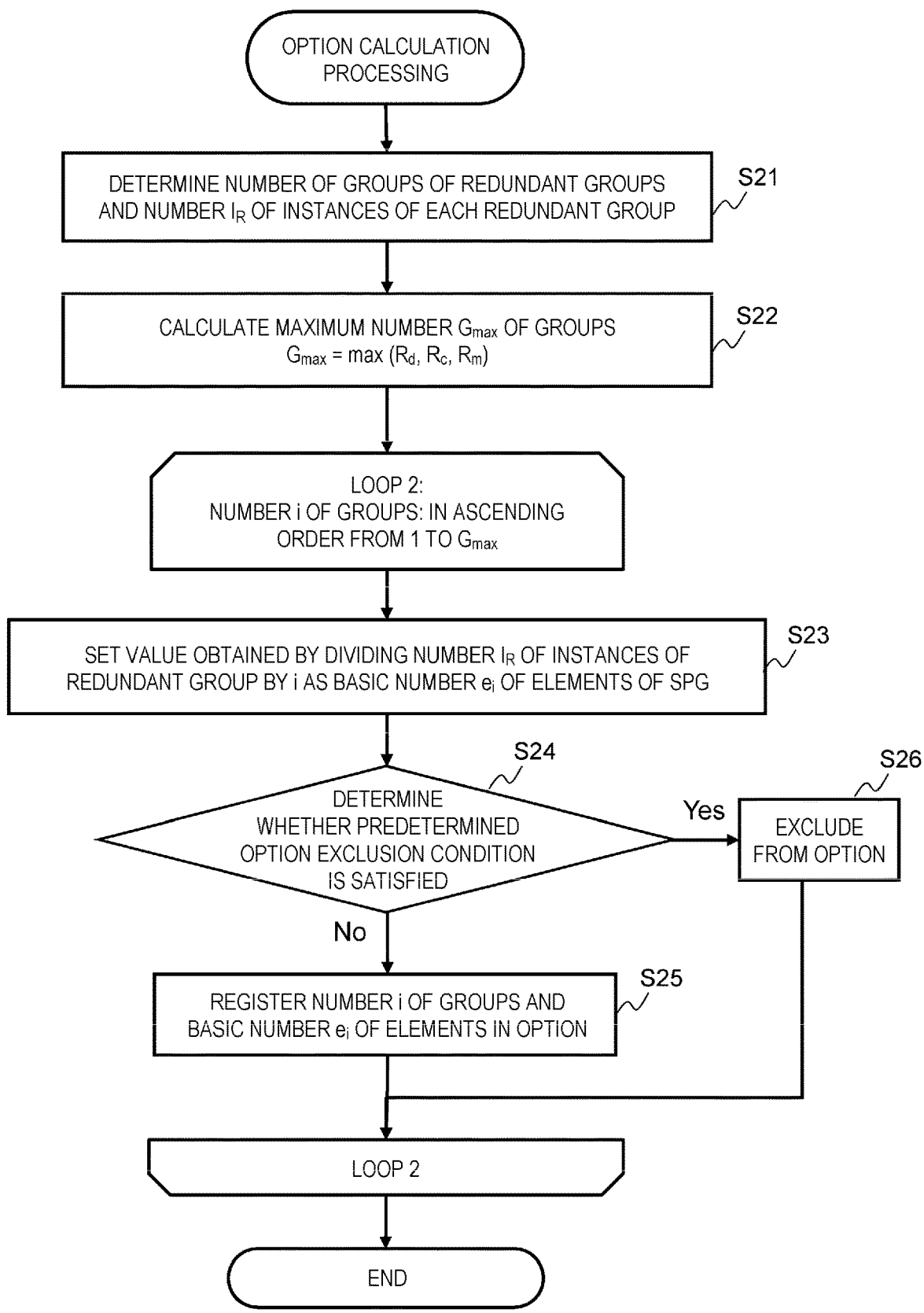
FIG. 21 is a flowchart of option calculation processing according to the embodiment.

FIG. 21 is a flowchart of the option calculation processing according to the embodiment.

The SDS cluster deployment program 104 determines the number of groups of the redundant groups and the number $I_R$ of instances of each redundant group (S21). Here, the number of groups of the redundant groups and the number $I_R$ of instances may be determined based on, for example, a total number of instances in an SDS cluster specified by the user and a minimum number (a minimum necessary number of instances) of instances necessary for implementing protection (redundancy) of the specified data.

For example, when the total number of instances is 12 and the 4D2P configuration is specified for the data protection, the minimum necessary number of instances is 6, and thus the number of redundant groups may be 12/6=2. If the total number of instances is 20, the number of redundant groups may be 3 by truncating a decimal part of 20/6=3.33 . . . In this case, the number of instances of each redundant group may be 7, 7, 6, or 8, 6, 6. When the total number of instances is less than the minimum necessary number of instances, the number of redundant groups may be set to 1, and the number of instances may be set to the minimum necessary number of instances. The number of groups of the redundant groups and the number $I_R$ of instances of each redundant group may be specified by the user.

Next, the SDS cluster deployment program 104 calculates a maximum number $G_{max}$ of groups (S22). Here, $G_{max}$=max $(R_d, R_c, R_m)$, in which $R_d$ refers to a redundancy degree of data in the specified data protection, Re refers to a redundancy degree of the redundant storage controller function, and $R_m$ refers to a redundancy degree of the redundant SDS cluster management function.

Here, the redundancy degree refers to a number at which failures can be withstood. For example, the redundancy degree of data is 1 when the data has a mirror configuration, and the redundancy degree of the data is 2 when the data has a 4D2P configuration. When the storage controllers include three storage controllers of active, standby, and standby storage controllers, the redundancy degree of the redundant storage controller function is 2.

Next, the SDS cluster deployment program 104 executes processing of a loop 2 (S23 to S26) for the number i of groups (i is in ascending order from 1 to $G_{max}$).

In the processing of the loop 2, the SDS cluster deployment program 104 sets a value obtained by dividing the number $I_R$ of instances of the redundant group by i as a basic number $e_i$ of elements of the SPG (S23). If $I_R$ is not divisible by i, a value obtained by rounding up a decimal part of a divided value is set as the basic number $e_i$ of elements of the SPG.

Next, the SDS cluster deployment program 104 determines whether a predetermined option exclusion condition is satisfied (S24). Here, the option exclusion condition is a condition for determining an option in which an appropriate SDS cluster cannot be constructed, and specifically includes, for example, a case in which the basic number $e_i$ of elements is larger than a maximum number (a maximum number of supported elements) of elements supported in the SPG, a case in which the number i of redundant groups constructing the SDS cluster management function is larger than $R_m$, and a case in which i is larger than $R_C$ and $R_D$.

As a result, when it is determined that the predetermined option exclusion condition is not satisfied (S24: No), the SDS cluster deployment program 104 registers, in the SPG configuration table 103, an entry of an option in which the number of groups is set as the number i of groups, and in which the number of elements is set as the basic number $e_i$ of elements (S25). If $I_R$ is not divisible by i in step S23, several SPGs have the basic number $e_i$ of elements, and one SPG has the remaining number of elements. For example, when the number $I_R$ of instances is 7 and i is 2, the basic number of elements $e_i$ is 4. Therefore, for one SPG, the number of instances is 4, which is set as the basic number $e_i$ of elements, and for the remaining SPG, the number of elements is 3, which is obtained by subtracting the basic number $e_i$ of elements from the number $I_R$ of instances.

On the other hand, when it is determined that the predetermined option exclusion condition is satisfied (S24: Yes), the SDS cluster deployment program 104 excludes the case of the number i of groups from the options (S26), and ends the processing of the loop 2 for the number i of groups.

The SDS cluster deployment program 104 executes the processing of the loop 2 for each number i of groups, and ends the option calculation processing when the processing is completed for all the number of groups.

Next, the instance deployment processing (S12) will be described.

Figure 22:
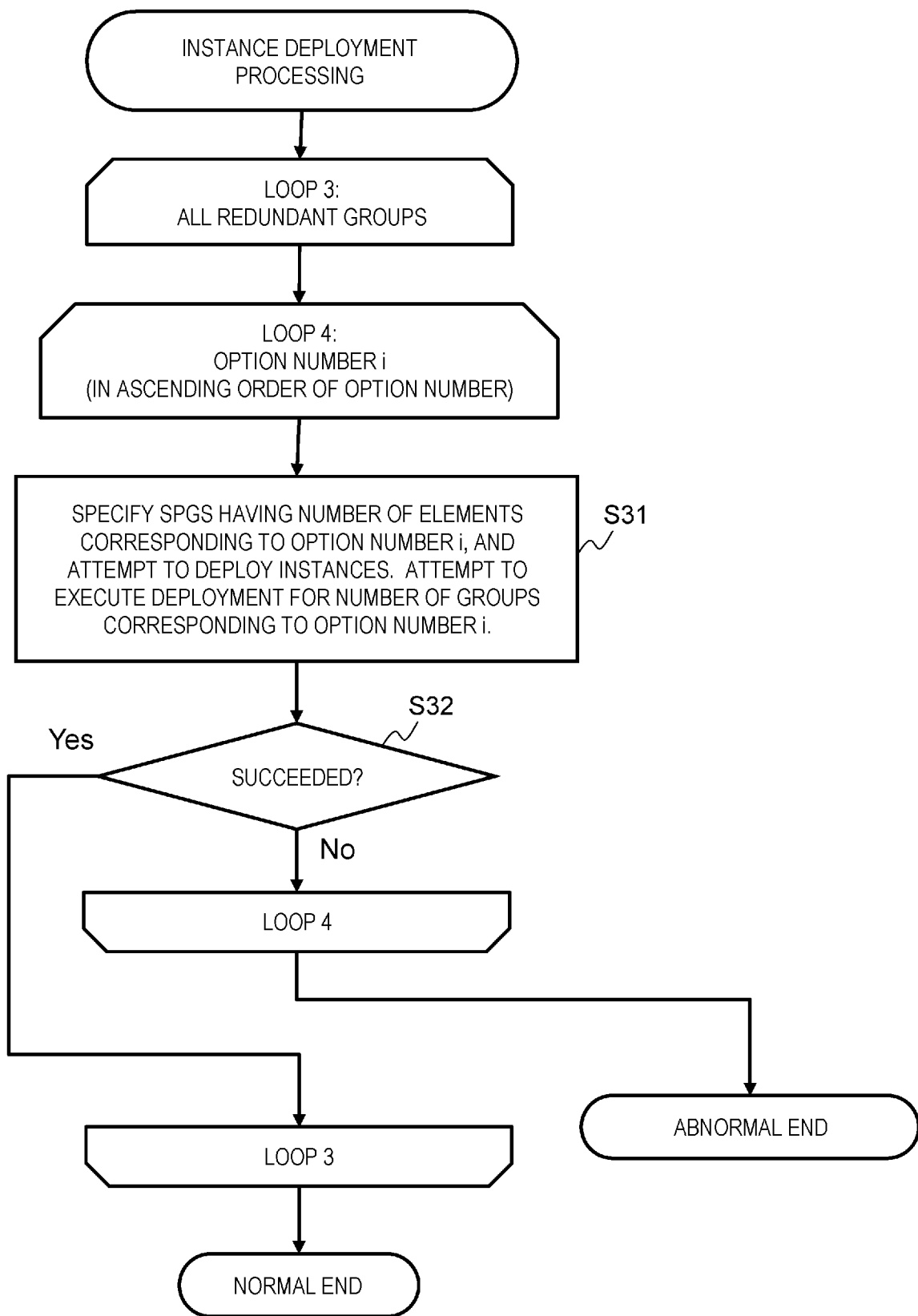
FIG. 22 is a flowchart of instance deployment processing according to the embodiment.

FIG. 22 is a flowchart of the instance deployment processing according to the embodiment.

The SDS cluster deployment program 104 executes processing of a loop 3 (a loop 4 (S31, S32)) for each redundant group of all redundant groups.

In the processing of the loop 3, the SDS cluster deployment program 104 executes the processing (S31, S32) of the loop 4 for the option of each option number i (in ascending order of option numbers).

In the processing of the loop 4, for the number of groups corresponding to the option number i, the SDS cluster deployment program 104 specifies SPGs having the number of elements corresponding to the option number i, and attempts to deploy the instances (S31).

Next, the SDS cluster deployment program 104 determines whether the deployment of the instances in step S31 is succeeded (S32).

As a result, when the deployment of the instances is succeeded (S32: Yes), the SDS cluster deployment program 104 exits the loop 4 and executes the processing of the loop 3 with a next redundant group as a processing target, and when the processing is executed for all the redundant groups, the SDS cluster deployment program 104 exits the processing of the loop 3 and ends the instance deployment processing.

On the other hand, when the deployment of the instances is not succeeded even if the processing is tried for all the option numbers (S32: No), the SDS cluster deployment program 104 exits the loop 4 and ends the instance deployment processing as abnormal end.

Next, the SDS cluster expansion processing will be described. The SDS cluster expansion processing is executed when, for example, the SDS cluster expansion program 105 receives an instruction to expand the SDS cluster from the user terminal 3.

Figure 23:
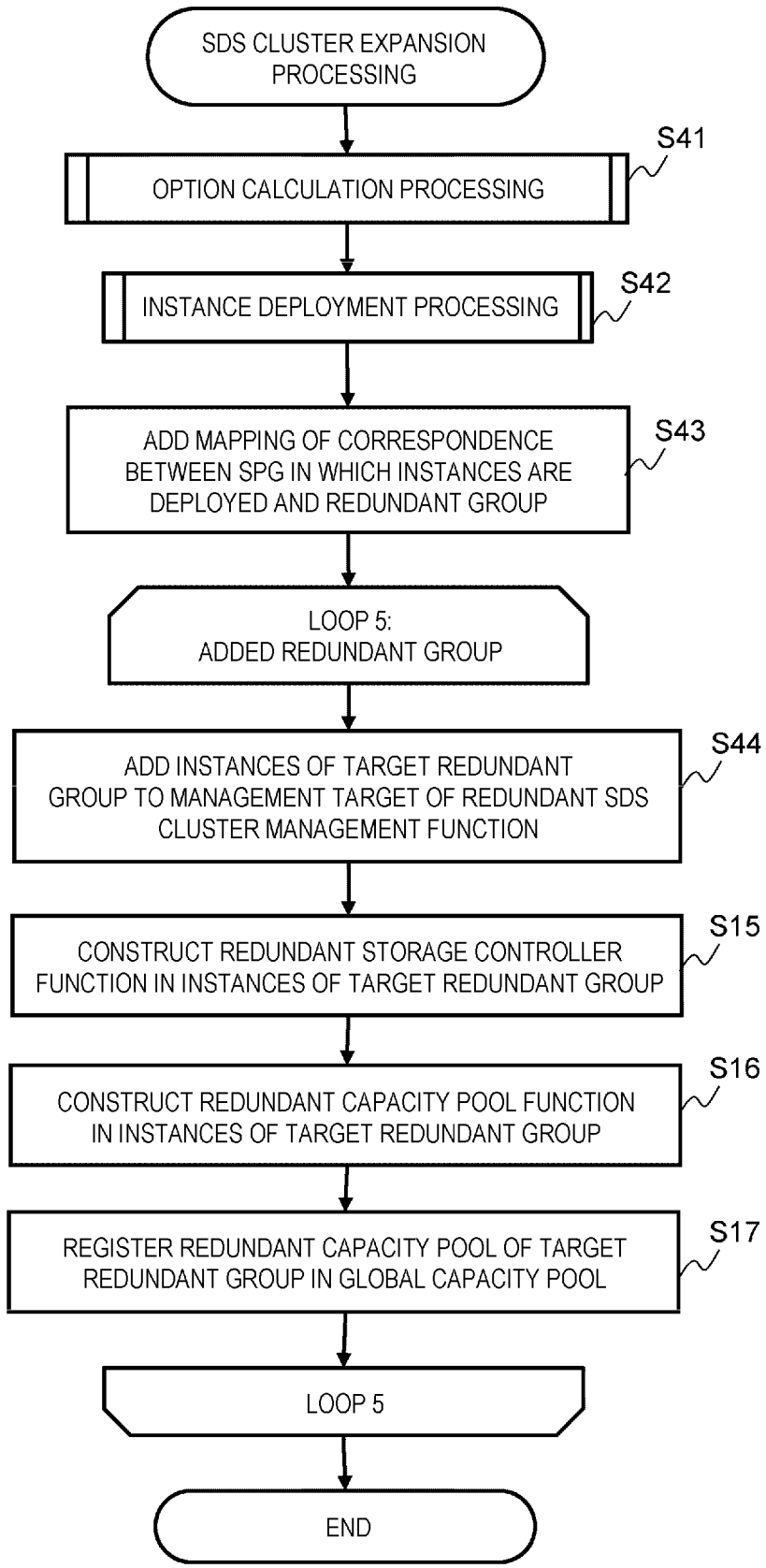
FIG. 23 is a flowchart of SDS cluster expansion processing according to the embodiment.

FIG. 23 is a flowchart of the SDS cluster expansion processing according to the embodiment. Steps the same as those of the SDS cluster deployment processing illustrated in FIG. 20 are denoted by the same reference numerals.

The SDS cluster expansion program 105 (strictly speaking, the CPU 62 that executes the SDS cluster expansion program 105) executes the option calculation processing (see FIG. 21) of calculating an option of the number of groups of the SPG and the number of elements (instances) in the SPG with an expanded part in the cluster as a target (S41).

Next, the SDS cluster expansion program 105 executes the instance deployment processing (see FIG. 22) of deploying instances using the SPG with the expanded part of the cluster as the target (S42).

Next, the SDS cluster expansion program 105 adds, to the mapping (the RG-SPG mapping table 101), a correspondence between the SPG in which the instances serving as the expanded part in the cluster are deployed and the RG including the SPG (S43).

Next, the SDS cluster expansion program 105 executes processing (S44, and S15 to S17) of a loop 5 with an added redundant group as a target. Here, the redundant group to be processed in the loop 5 is referred to as a target redundant group.

In the processing of the loop 5, the SDS cluster expansion program 105 adds the instances of the target redundant group to management targets of the redundant SDS cluster management function 71 (S44). Next, the SDS cluster expansion program 105 executes the processing of steps S15, S16, and S17.

The SDS cluster expansion program 105 executes the processing of the loop 5 for each added redundant group, and ends the SDS cluster expansion processing when the processing is completed for all redundant groups.

According to the SDS cluster expansion processing, the SDS cluster can be expanded to withstand failures.

Next, the service volume generation processing will be described.

FIG. 24 is a flowchart of the service volume generation processing according to the embodiment.

The service volume generation program 111 (strictly speaking, the CPU 62 that executes the service volume generation program 111) selects, from the global capacity pool 84, the redundant capacity pool 80 having a free capacity specified as the service volume to be created (S51).

Next, the service volume generation program 111 allocates a capacity from the selected redundant capacity pool 80 to the service volume 83 (S52).

Next, the service volume creation program 111 selects any of the active controllers of the instances 40 belonging to the redundant group 70 provided by the selected redundant capacity pool 80, allocates the created service volume 83 (S53), and ends the processing. After this processing, according to a known technique, a path or the like is registered for the storage client 42 so as to be accessible to the service volume 83.

The invention is not limited to the embodiment described above, and may be appropriately modified and implemented without departing from the gist of the invention.

For example, in the embodiment described above, a part or all of the processing executed by the CPU may be executed by a hardware circuit. The programs in the embodiment described above may be installed from a program source. The program source may be a program distribution server or a storage medium (for example, a portable storage medium).

What is claimed is:

1. A computer system comprising:
a storage system configured to provide a plurality of instances in any one of a plurality of predetermined subzones defined by risk boundaries; and
a processor configured to implement a plurality of spread placement groups (SPGs), each SPG having a plurality of respective instances,
wherein each of the plurality of instances in each SPG are arranged in different respective subzones,
wherein the plurality of instances implement a function of a redundant storage controller that controls input/output (I/O) processing for a volume based on a capacity pool provided by a plurality of storage devices redundant to the plurality of instances provided in different subzones in the SPGs,
wherein data is redundantly stored in the plurality of storage devices of the volume by the plurality of instances implementing the redundant storage controller function,
wherein a plurality of instances in different SPGs are arranged in a same subzone, and
wherein a redundancy degree of the redundancy storage controller function is a redundancy degree n, which is a redundancy degree that withstands a failure occurring in n subzones and each respective redundancy storage controller function implements the n number of SPGs.

2. The computer system according to claim 1,
wherein the processor is configured to implement an active storage controller in one instance of the SPG, and to implement a standby storage controller which is a failover for the active storage controller in one or more other instances of the SPG.

3. The computer system according to claim 1,
wherein the processor is configured to:
implement a plurality of chunks based on the storage devices in the plurality of instances belonging to the SPG that are the same as the instances which implement the redundant storage controller function, and
make data redundant by storing two or more pieces of data or parity data generated based on the data among the plurality of chunks.

4. The computer system according to claim 3,
wherein the processor is configured to make a storage cluster management unit that clusters and manages the redundant storage controller function of the plurality of SPGs redundant to at least one of the plurality of SPGs.

5. The computer system according to claim 1,
wherein the processor configured to make data redundant by data parity configuration in which a plurality of data and parity are combined, and for data redundancy, the instances of the total number of data number and parity number included in the data parity configuration is required, and
wherein when the number of instances configured to be provided in one SPG is less than the number of instances necessary for data protection of the capacity pool, the processor implements the redundant storage controller function according to the capacity pool in the number of instances required for data protection of the plurality of SPGs.

6. The computer system according to claim 1,
wherein the processor is configured to:
make data redundant by data parity configuration in which a plurality of data and parity are combined, and for the data redundancy, the instances of the total number of data number and parity number included in the data parity configured is required, and
implement, based on the number of instances required for data redundancy, one or more redundant groups including instances of a number within a maximum number of instances configured to be created in the SPG, and make pairs of primary chunks and redundant chunks.

7. The computer system according to claim 1,
wherein the processor is configured to:
identify, based on a redundancy degree of protection of data of the capacity pool and the redundancy of the storage controller, a maximum number of groups in the SPGs in a redundant group including the plurality of instances to be subjected to the protection of the data of the capacity pool and the redundancy of the redundant storage controller function, and
determine, in a range equal to or less than the identified maximum number of groups, a number of SPGs constituting the redundant group and a number of instances in the SPG, and make data on the storage device and the redundant storage controller redundant function based on the determined number of SPGs and instances of the number of instances.

8. A redundant element configuration method using a computer system, the computer system including a storage system configured to provide a plurality of instances in any one of a plurality of predetermined subzones defined by risk boundaries, the method comprising:
implementing a plurality of spread placement groups (SPGs), each SPG having a plurality of respective instances, respectively, wherein each of the plurality of instances in each SPG are arranged in different respective subzones; and implementing a function of a redundant storage controller that controls I/O processing for a volume based on a capacity pool provided by a plurality of storage devices redundant to a plurality of instances provided in different subzones in the SPGs, wherein data is redundantly stored in the plurality of storage devices of the volume by the plurality of instances implementing the redundant storage controller function, wherein a plurality of instances in different SPGs are arranged in a same subzone, and wherein a redundancy degree of the redundancy storage controller function is a redundancy degree n, which is a redundancy degree that withstands a failure occurring in n subzones and each respective redundancy storage controller function implements the n number of SPGs.

9. The computer system according to claim 1,
wherein the plurality of spread placement groups (SPG) are provided in the plurality of subzones with different combinations.

10. The computer system according to claim 2,
wherein a set of the plurality of active storage controllers and the standby storage controller which succeeds the process are configured in one SPG, and in the same instance, the active storage controller and the standby storage controller which are not form a same set are provided.

11. The computer system according to claim 1,
wherein the processor is configured to:
make data redundant by data parity configuration in which a plurality of data and parity are combined,
for data redundancy, the instances of the total number of data number and parity number included in the data parity configuration is required, and
determine, based on the number of instances necessary for data redundancy and the number of instances that the computer system has, the number of spread placement groups (SPG) to be created.

12. The computer system according to claim 1,
wherein if the number of instances implementing the redundancy storage controller function exceeds the number of instances that can be arranged in one SPG, the redundancy storage controller function of the redundancy degree n is implemented by use of n number of SPGs.

* * * * *